(12) United States Patent
Nishimura et al.

(10) Patent No.: US 8,270,824 B2
(45) Date of Patent: Sep. 18, 2012

(54) ATTACHMENT LENS DEVICE, AND IMAGING APPARATUS INCORPORATING THE SAME

(75) Inventors: Kazuya Nishimura, Akiruno (JP); Hideyuki Nagaoka, Hino (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/932,013

(22) Filed: Feb. 15, 2011

(65) Prior Publication Data

US 2011/0206359 A1 Aug. 25, 2011

(30) Foreign Application Priority Data

Feb. 24, 2010 (JP) ................................. 2010-038192

(51) Int. Cl.
G03B 17/00 (2006.01)
G03B 13/00 (2006.01)

(52) U.S. Cl. ......................................... 396/79; 348/348

(58) Field of Classification Search .................... 396/79; 348/348
See application file for complete search history.

(56) References Cited

U.S. PATENT DOCUMENTS

| 5,758,206 | A * | 5/1998 | Imaoka ........................... 396/80 |
| 6,577,343 | B2 * | 6/2003 | Ohkawara ..................... 348/347 |
| 2001/0048479 | A1 * | 12/2001 | Ohkawara et al. ........... 348/360 |
| 2002/0149692 | A1 * | 10/2002 | Tomita et al. ................. 348/345 |
| 2006/0232697 | A1 * | 10/2006 | Ito et al. ....................... 348/345 |
| 2006/0232701 | A1 * | 10/2006 | Ito et al. ....................... 348/348 |
| 2007/0273783 | A1 * | 11/2007 | Okazaki et al. .............. 348/345 |
| 2009/0066832 | A1 * | 3/2009 | Hirasawa et al. ............ 348/345 |
| 2009/0262235 | A1 * | 10/2009 | Kawazoe et al. ............ 348/345 |
| 2011/0001858 | A1 * | 1/2011 | Shintani et al. .............. 348/294 |

FOREIGN PATENT DOCUMENTS

| JP | 58-043415 | 3/1983 |
| JP | 01-284811 | 11/1989 |
| JP | 08-286109 | 11/1996 |

* cited by examiner

Primary Examiner — Rodney Fuller
(74) Attorney, Agent, or Firm — Kenyon & Kenyon LLP

(57) ABSTRACT

The attachment lens device AL, 12 can be mounted between a master lens ML, 12 having a focusing lens group that moves in an optical axis direction for focusing purposes and a camera body 11 having an imaging device. The attachment lens device AL, 12 comprises a communication portion 35, 135 communicatable with the master lens ML, 12 and the camera body 11, a wobbling lens group LW capable of reciprocally wobbling in the optical axis direction for detecting a direction of moving the wobbling lens group, and a wobbling drive portion 125 for driving the wobbling lens group Lw.

25 Claims, 18 Drawing Sheets

Example 5

Example 6

Example 5

Example 6

Example 7

Example 8

Mater Lens

Mater Lens+Example 1

ATTACHMENT LENS DEVICE, AND IMAGING APPARATUS INCORPORATING THE SAME

This application claims benefit of Japanese Application No. 2010-038192 filed in Japan on Feb. 24, 2010, the contents of which are incorporated by this reference.

BACKGROUND OF THE INVENTION

The present invention relates to an attachment lens device to be inserted between a master lens and a camera body, and an imaging apparatus incorporating the same.

So far, there has been an attachment lens device known in the art that can be attached between an assortment of interchangeable lenses, each providing a master lens, and a camera body, and comprises a focusing lens group to be moved for the purpose of implementing focusing.

For instance, JP(A) 58-43415 discloses an attachment lens device having a lens movable in the optical axis direction, wherein the focusing of a combined master lens/attachment lens device optical system is implemented by movement of lenses in the attachment lens device.

JP(A) 8-286109 discloses an apparatus designed to implement focusing by both a master lens and an attachment lens device, thereby making a focusable area wider.

JP(A) 1-284811 discloses an attachment lens device that, when focusing by a focusing lens group in a master lens is less than satisfactory, is actuated to move a focusing lens group in it for focusing purposes.

Recently for a camera designed to take moving or still images, reliance has often been on a contrast type focusing mode wherein a focusing lens group in an assortment of interchangeable lenses used with that camera is moved to detect an in-focus peak where there is the highest contrast obtained.

For interchangeable lenses that implement focusing operation in the contrast mode, there has been a technical method known wherein a focusing lens group is finely vibrated (wobbled) in the optical axis direction, and then moved on the basis of a contrast change for focusing, thereby boosting up focusing speed and/or focusing precision.

With an interchangeable lens having none of the aforesaid wobbling capability, an operator may miss out on right timings because there is an extension of movement of the focusing lens group, which may otherwise render out-of-focusing time longer upon focusing operation.

Nowhere in JP(A) s 58-43415, 8-286109 and 1-284811 is wobbling mentioned; even when an interchangeable lens having no wobbling capability is used to implement focusing on a contrast readings basis, it is impossible to achieve sufficiently fast focusing operation.

SUMMARY OF THE INVENTION

The present invention provides an attachment lens device that can be attached between a master lens comprising a focusing lens group able to move in an optical axis direction for focusing purposes and a camera body comprising an imaging device. For that attachment lens device, it is preferable to have an electrical contact that is electrically connectable to said master lens and said camera body, a wobbling lens group that wobbles reciprocally in the optical axis direction to detect a direction of movement of said focusing lens group, and a wobbling drive portion for driving said wobbling lens group.

The inventive attachment lens device being constructed as described above, the reciprocal movement of the wobbling lens group in the attachment lens device brings about a change in the contrast of an image on the imaging device in the camera body, and by detecting that contrast change it is possible to figure out by calculation the direction and amount of movement of the focusing lens group in such a way as to draw close to the contrast peak.

Signals are sent from the camera body to the focusing lens group in the master lens so that focusing can be quickly implemented.

Even with the master lens having no wobbling capability, it is possible to boost up focusing speed and improve the ability of focusing to follow moving images if it is attached to the camera body via the attachment lens device.

The F-number of the combined master lens/attachment lens device optical system is produced by a change in the aperture area of an aperture stop, a focus length changes, and master lens replacement. The amount of blurring relative to the amplitude of an image position during wobbling operation changes depending on the F-number of the master lens; that is, it is preferable to alter the extent of movement of the wobbling lens group in the optical axis direction depending on the F-number of the master lens. It is here to be noted that the upper limit to the amplitude of the wobbling lens group capable of reciprocal movement may be preset as design specifications.

It is more preferable to satisfy the following requirements independently or in combination of two or more at the same time.

For the attachment lens device, it is preferable to satisfy the following condition (1) in terms of the extent of reciprocal movement of the wobbling lens group in the optical axis direction.

$$D\text{wob}/(F\text{no} \times \beta w \times \epsilon) > 0.3 \tag{1}$$

Here Dwob is half the extent of movement of the wobbling lens group in the optical axis direction, Fno is the F-number of the combined master lens/attachment lens device optical system during wobbling operation, $\beta w$ is the magnification of the attachment lens device at the time when the wobbling lens group lies halfway the extent of reciprocal movement of the wobbling lens group and the attachment lens device is attached to the camera body, and $\epsilon$ is the radius of an admissible circle of confusion, and defined as $\epsilon = 0.0005L$ where L is the diagonal length of an effective imaging area of the imaging device.

Reciprocal movement of the wobbling lens group at not less than the lower limit to Condition (1) makes image contrast changes so easily detectable that focusing precision or focusing speed can be boosted up.

More preferably, the lower limit should be set at 0.5.

For the attachment lens device it is also preferable to satisfy the following condition (2).

$$0.3 < D\text{wob}/(F\text{no} \times \beta w \times \epsilon) < 3.0 \tag{2}$$

Limiting the amount of reciprocal movement of the wobbling lens group to not greater than the upper limit to Condition (2) works in favor of size reductions of a rear conversion lens device, and is well compatible with an assortment of interchangeable lenses, each usable as the master lens. It is also preferable in that optical performance changes during wobbling operation are less noticeable.

More preferably, the upper limit should be set at 2.5 in general and 2.0 in particular.

For the attachment lens device it is preferable to satisfy the following condition (3).

$$0.95 < \beta w < 1.3 \tag{3}$$

Here $\beta w$ is the magnification of the attachment lens device at the time when the wobbling lens group lies halfway the extent of reciprocal movement and the attachment lens device is attached to the camera body.

As the lower limit to Condition (3) is set at not less than 0.95, it reduces shading of an effective light beam at the master lens without leaving the attachment lens device bulky, so making sure the type of the master lens well compatible with the attachment lens device. It is here to be noted that a decrease in the quantity of rim light by shading, if any, may be electrically corrected, but the lower the degree of correction, the more preferable, because image quality is ensured.

As the upper limit to Condition (3) is set at not greater than 1.3, it causes the focal length of the combined optical system to change less relative to the focal length of the master lens. This is preferable because the angle of view on a wide-angle side is maintained.

More preferably, the lower limit should be set at 0.98 in general and 1.0 in particular while the upper limit should be set at 1.1.

Preferably, the attachment lens device of the invention should further comprise an object-side lens group that is located on the object side of the wobbling lens group and remains fixed during wobbling, and an image-side lens group that is located on the image side of the wobbling lens group and remains fixed during wobbling.

The wobbling lens group is one that moves reciprocally; as it receives an external force from an operator s finger or the like, there will be a likelihood that the driving mechanism for wobbling may suffer from damage. Therefore, constructing the attachment lens group as described above is preferable in that the wobbling lens group can be protected against external forces.

In this conjunction, it is preferable that the wobbling lens group has positive refracting power, provided that said refracting power is greater than the absolute values of the respective refracting powers of said object-side lens group and said image-side lens group.

This could help incur contrast changes during wobbling while the amount of movement of the wobbling lens group is limited.

Preferably, the aforesaid object-side lens group and the image-side lens group should each have negative refracting power.

As both the object-side and the image-side lens groups have negative refracting powers, it works in favor of reduced aberration fluctuations.

For the attachment lens device it is preferable to satisfy the following condition (4).

$$-0.9 < \phi w/(\phi O + \phi I) < -0.7 \tag{4}$$

Here $\phi w$ is the refracting power of the aforesaid wobbling lens group, $\phi O$ is the refracting power of the aforesaid object-side lens group, and $\phi I$ is the refracting power of the aforesaid image-side lens group.

Refracting power means the reciprocal of focal length. As the lower and upper limits to Condition (4) are set at not less than −0.9 and not greater than −0.7, respectively, it makes it easy for the magnification of the attachment lens group to come close to 1×.

For the attachment lens device it is preferable to satisfy the following condition (5).

$$0.5 < \phi O/\phi I < 2.0 \tag{5}$$

As the lower and upper limits to Condition (5) are set at not less than 0.5 and not greater than 2.0, respectively, it works well for symmetry of the optical system in the attachment lens group, and so for correction of various aberrations.

More preferably, the lower limit should be set at 0.7 and/or the upper limit should be set at 1.5.

Preferably, the wobbling lens group should be a lens of double-convex shape that has an object-side surface convex on its object side and an image-side surface convex on its image side, and satisfies the following condition (6).

$$-0.8 < (RwO + RwI)/(RwO - RwI) < -0.1 \tag{6}$$

Here $RwO$ is the radius of curvature of the object-side surface in the aforesaid wobbling lens group, and $RwI$ is the radius of curvature of the image-side surface in the aforesaid wobbling lens group.

As the wobbling lens group is made up of a double-convex lens, it makes correction of aberrations easier while making sure the wobbling lens group has the necessary positive refracting power.

As the lower limit to Condition (6) is set at not less than −0.8, it makes it easy to reduce field curvature fluctuations, and as the upper limit is set at not greater than −0.1, it makes it easy to reduce aberration fluctuations while making sure the image-side lens group has negative refracting power.

More preferably, the lower and upper limits should be set at −0.6 and −0.3, respectively.

Preferably, the wobbling lens group should be a single lens of double-convex shape.

This enables the lens group driven during wobbling operation to decrease in weight, working in favor of power savings, faster operation, and control with higher precision.

Preferably, the aforesaid wobbling lens group should have an object-side surface convex on its object side, and the aforesaid object-side lens group should have a concave surface opposite to the wobbling lens group, with satisfaction of the following conditions (7) and (8).

$$0.5 < ROI/RwO < 2.0 \tag{7}$$

$$0.5 < RwI/RIO < 2.9 \tag{8}$$

Here $RwO$ is the radius of curvature of the object-side surface in the aforesaid wobbling lens group, $ROI$ is the radius of curvature of the concave surface of the aforesaid object-side lens opposite to the aforesaid wobbling lens group, $RwI$ is the radius of curvature of the image-side surface in the aforesaid wobbling lens group, and $RIO$ is the radius of curvature of the surface in the aforesaid image-side lens group and opposite to the aforesaid wobbling lens group.

Satisfaction of Conditions (7) and (8) makes sure the object-side convex surface in the wobbling lens group comes close in shape to the opposite concave surface, and the image-side surface in the wobbling lens group comes close in shape to the opposite concave surface. This in turn works for making sure the extent of movement of the wobbling lens group while keeping the size of the attachment lens device small. In addition, it becomes easy to reduce magnification and aberration fluctuations during wobbling operation.

More preferably, the lower limits to one or both of Conditions (7) and (8) should be set at 0.6, and the upper limits to one or both of Conditions (7) and (8) should be set at 1.9, especially 1.3.

Preferably, the object-side lens group should comprise a positive lens and a negative lens convex on its image side, and the image-side lens group should comprise a convex lens concave on its object side and an image-side lens that has a sign of refracting power different from that of said convex lens concave on its object side wherein one is a positive lens and the other is a negative lens, with satisfaction of the following conditions (9) and (10).

$$-25 < vOp - vOn < -15 \quad (9)$$

$$10 < vIp - vIn < 25 \quad (10)$$

Here vOp is the Abbe constant of the positive lens in the object-side lens group, vOn is the Abbe constant of the negative lens in the object-side lens group, vIp is the Abbe constant of the positive lens in the image-side lens group, and vIn is the Abbe constant of the negative lens in the image-side lens group.

Each of the object-side and the image-side lens group comprises a positive lens and a negative lens, working in favor of correction of various aberrations. Especially if each lens group satisfies Conditions (9) and (10), it works in favor of correction of chromatic aberrations.

Referring to both Conditions (9) and (10), a decrease in the absolute value of the difference will undermine the function of correcting chromatic aberrations, and an increase in the absolute value of the difference will lead to an increased material cost.

According to the invention, such imaging apparatus as described below may be set up.

The imaging apparatus of the invention comprises a master lens including a focusing lens group that moves in an optical axis direction for focusing, a camera body including an imaging device, and the attachment lens device of the invention.

Preferably, the master lens, the camera body and the attachment lens device should have electrical contacts electrically connectable to one another, and the camera body should have a focusing lens group drive signal generation portion for generating, in response to a contrast change occurring from reciprocal movement of the wobbling lens group, a signal for movement of the focusing lens group in the master lens.

According to the invention, such imaging systems as described below may be set up.

In one embodiment of the invention, there is an imaging system provided which comprises a lens-interchangeable camera body having an imaging plane and an autofocus mechanism for detecting contrast on said imaging plane to implement focusing; a master lens that has an electrically operating focus lens group, is electrically connectable to said camera body and has a flange back longer than that of said camera body; and an attachment lens device that is mounted between said master lens and said camera body in such a way as to provide mechanical and electrical connections between said master lens and said camera body, and has one or more built-in lenses; and said master lens, said camera body and said attachment lens device being capable of communicating with one another, wherein said attachment lens device comprises a wobbling lens group enabling the whole or a part of lenses in said attachment lens device to be movable in an optical axis direction; and said master lens and said attachment lens device are attached to said camera body; and said imaging system further comprising an AF control mechanism wherein when the value of contrast on said imaging plane is estimated to be low, said focus lens group in said master lens is moved in a certain direction while the contrast on said imaging plane is detected, and said focus lens group in said master lens is brought to a stop at a position where a position at which the value of contrast is estimated to be highest is substantially in alignment with the position of said imaging plane, and near an in-focus position, said wobbling lens group in said attachment lens device is reciprocally moved in an optical axis direction to detect contrasts near both termini of reciprocal movement, and said focus lens group in said master lens is moved such that the values of contrasts at both termini are estimated to be substantially constant, thereby maintaining an in-focus state.

In another embodiment of the invention, there is an imaging system provided which comprises a lens-interchangeable camera body having an imaging plane and an autofocus mechanism for detecting contrast on said imaging plane to implement focusing; a master lens that has an electrically operating focus lens group, is electrically connectable to said camera body and has a flange back longer than that of said camera body; and an attachment lens device that is mounted between said master lens and said camera body in such a way as to provide mechanical and electrical connections between said master lens and said camera body, and has one or more built-in lenses; said master lens, said camera body and said attachment lens device being capable of communicating with one another; wherein said attachment lens device comprises a wobbling lens group enabling the whole or a part of lenses in said attachment lens device to be movable in an optical axis direction; said master lens and said attachment lens device are attached to said camera body; and said imaging system further comprising an AF control mechanism wherein when the value of contrast on said imaging plane is estimated to be low, said focus lens group in said master lens is moved in a certain direction while the contrast on said imaging plane is detected, and if the value of contrast is estimated to be greater than a given level, said focus lens group is brought to a stop, and while said focus lens group remains stopped, said wobbling lens group in said attachment lens device is reciprocally moved in an optical axis direction to move said focus lens group in said master lens such that the values of contrast near both termini of reciprocal movement are estimated to be substantially constant, arriving at an in-focus state.

Preferably, the aforesaid camera body should further comprise an image processing portion for helping correct distortion by image correction.

Preferably, the aforesaid camera body should comprise a display portion for displaying an image subjected to contrast detection, and a recording portion for recording an image subjected to contrast detection.

Preferably, the aforesaid camera body should comprises an image capturing portion for capturing an image at the time when said wobbling lens group is reciprocally moved in the optical axis direction to detect contrast, an image correction portion for electrically correcting a captured image for distortion in association with the movement of said wobbling lens group and an image capturing state, a display portion for providing a display using an image after said image correction, and a recording portion for recording an image after said image correction.

Preferably, the image circle of said master lens should be substantially the same as the image circle of said camera body.

Preferably, at least one of the speed and amount of movement of said wobbling lens group should change depending on the actual diaphragm stop of said master lens upon contrast estimation.

Preferably, there should be no direct communication between said master lens group and said camera body, and said master lens group, said camera body and said attachment lens device should be integrally controlled via said master lens group and said attachment lens device.

Preferably, any one of said master lens, said attachment lens device and said camera body should comprise a parameter recording portion where parameters upon connection of said master lens and said wobbling lens device are recorded, and said camera body should use said parameters during focusing operation.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

The attachment lens device here is now explained with reference to Examples 1 to 8. FIGS. 1 to 8 are illustrative in lens section of Examples 1 to 8, respectively.

In FIGS. 1 to 8, E stands for an entrance pupil; Go an object-side lens group; Gw a wobbling lens group; Gi an image-side lens group; SF a ultrasonic filter; IRF an IR cut filter; P a plane-parallel plate; LPF an optical low-pass filter; C a cover glass for an electronic imaging device CCD; and I an image plane of CCD. It is here to be noted that the plane-parallel plate P is used for making up for a thickness change of the LPF depending on an image pitch.

In common throughout the examples, the wobbling lens group Gw is the third lens L3 made up of one positive lens.

Figure 1:
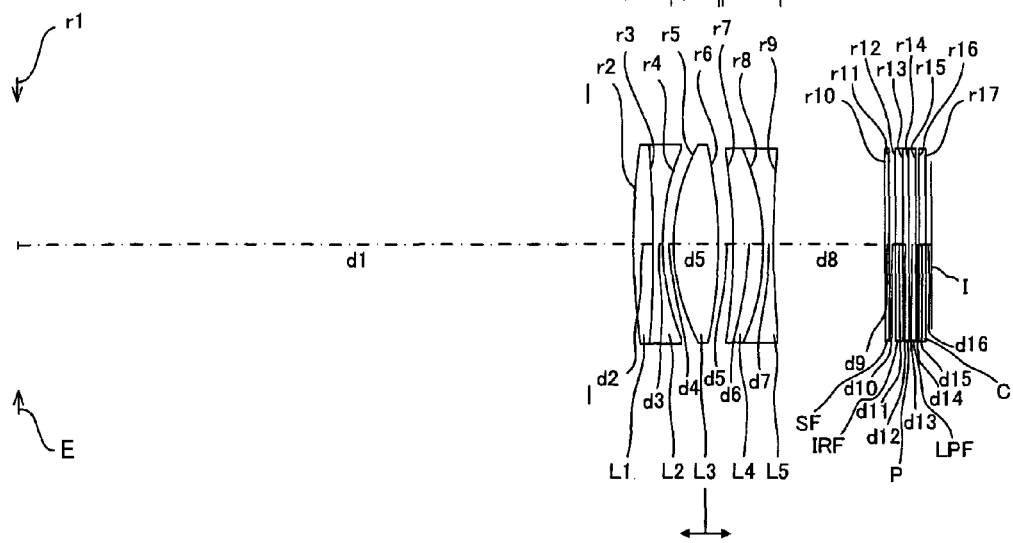
FIG. 1 is illustrative in lens section of Example 1 of the attachment lens device.

As shown in FIG. 1, the attachment lens device of Example 1 is built up of, in order from its object side, the entrance pupil E, the object-side lens group Go of negative refracting power, the wobbling lens group Gw of positive refracting power, and the image-side lens group Gi of negative refracting power.

The object-side lens group Go is made up of a cemented lens in which, in order from its object side, the first lens L1 that is a double-convex positive lens is cemented to the second lens L2 that is a double-concave negative lens. The wobbling lens group Gw is made up of the third lens L3 that is one double-convex positive lens. The image-side lens group Gi is made up of a cemented lens in which, in order from its object side, the fourth lens L4 that is a positive meniscus lens convex on its image side is cemented to the fifth lens L5 that is a double-concave negative lens.

The focal length is −227.15 mm.

Figure 2:
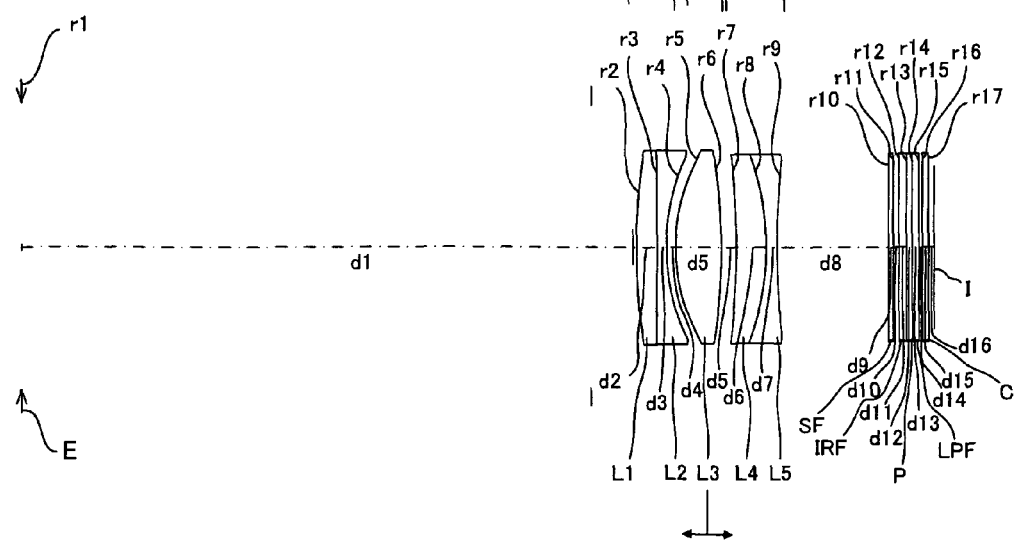
FIG. 2 is illustrative, as in FIG. 1, of Example 2 of the attachment lens device.

As shown in FIG. 2, the attachment lens device of Example 2 is built up of, in order from its object side, the entrance pupil E, the object-side lens group Go of negative refracting power, the wobbling lens group Gw of positive refracting power, and the image-side lens group Gi of negative refracting power.

The object-side lens group Go is made up of a cemented lens in which, in order from its object side, the first lens L1 that is a positive meniscus lens convex on its object side is cemented to the second lens L2 that is a negative meniscus lens convex on its object side. The wobbling lens group Gw is made up of the third lens L3 that is one double-convex positive lens. The image-side lens group Gi is made up of a cemented lens in which the fourth lens L4 that is a positive meniscus lens convex on its image side is cemented to the fifth lens L5 that is a double-concave negative lens.

The focal length is −218.20 mm.

Figure 3:
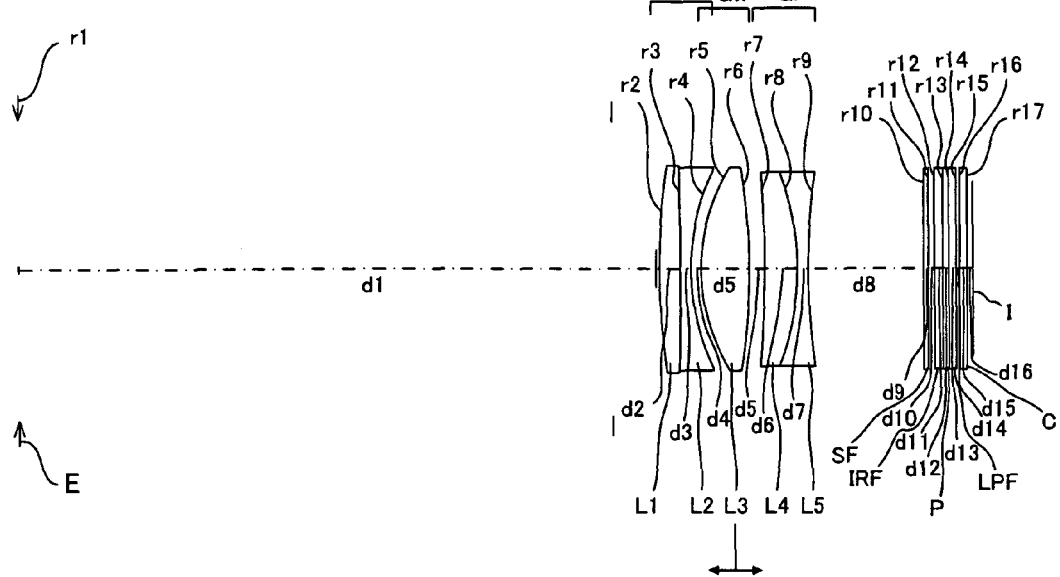
FIG. 3 is illustrative, as in FIG. 1, of Example 3 of the attachment lens device.

As shown in FIG. 3, the attachment lens device of Example 3 is built up of, in order from its object side, the entrance pupil E, the object-side lens group Go of negative refracting power, the wobbling lens group Gw of positive refracting power, and the image-side lens group Gi of negative refracting power.

The object-side lens group Go is made up of a cemented lens in which, in order from its object side, the first lens L1 that is a double-convex positive lens is cemented to the second lens L2 that is a double-concave negative lens. The wobbling lens group Gw is made up of the third lens L3 that is one double-convex positive lens. The image-side lens group Gi is made up of a cemented lens in which, in order from its object side, the fourth lens L4 that is a positive meniscus lens convex on its image side is cemented to the fifth lens L5 that is a double-concave negative lens.

The focal length is −215.03 mm.

Figure 4:
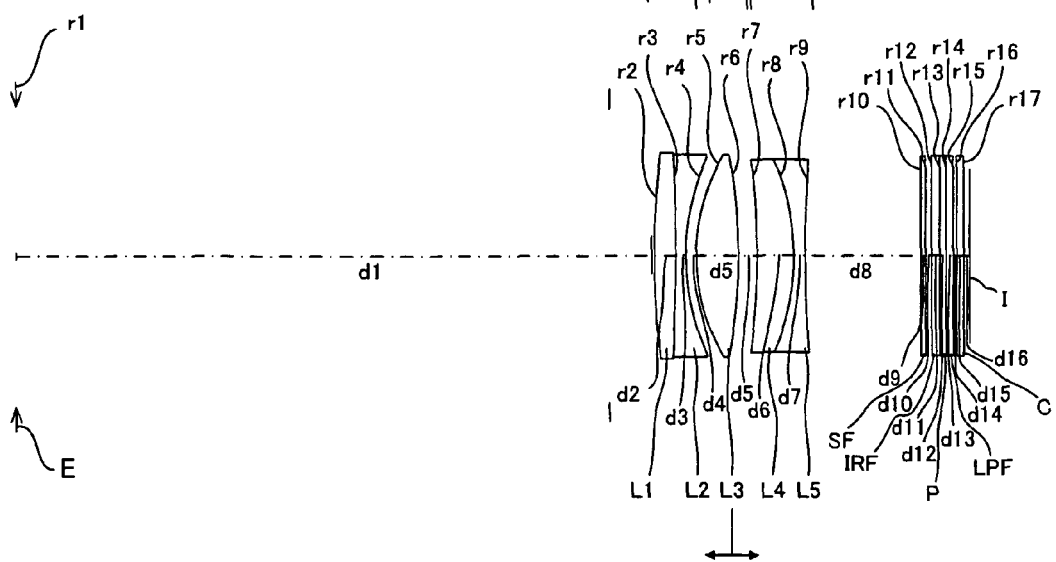
FIG. 4 is illustrative, as in FIG. 1, of Example 4 of the attachment lens device.

As shown in FIG. 4, the attachment lens device of Example 4 is built up of, in order from its object side, the entrance pupil E, the object-side lens group Go of negative refracting power, the wobbling lens group Gw of positive refracting power, and the image-side lens group Gi of negative refracting power.

The object-side lens group Go is made up of a cemented lens in which, in order from its object side, the first lens L1 that is a double-convex positive lens is cemented to the second lens L2 that is a double-concave negative lens. The wobbling lens group Gw is made up of the third lens L3 that is one double-convex positive lens. The image-side lens group Gi is made up of a cemented lens in which, in order from its object side, the fourth lens L4 that is a positive meniscus lens convex on its image side is cemented to the fifth lens L5 that is a double-concave negative lens.

The focal length is −226.46 mm.

Figure 5:
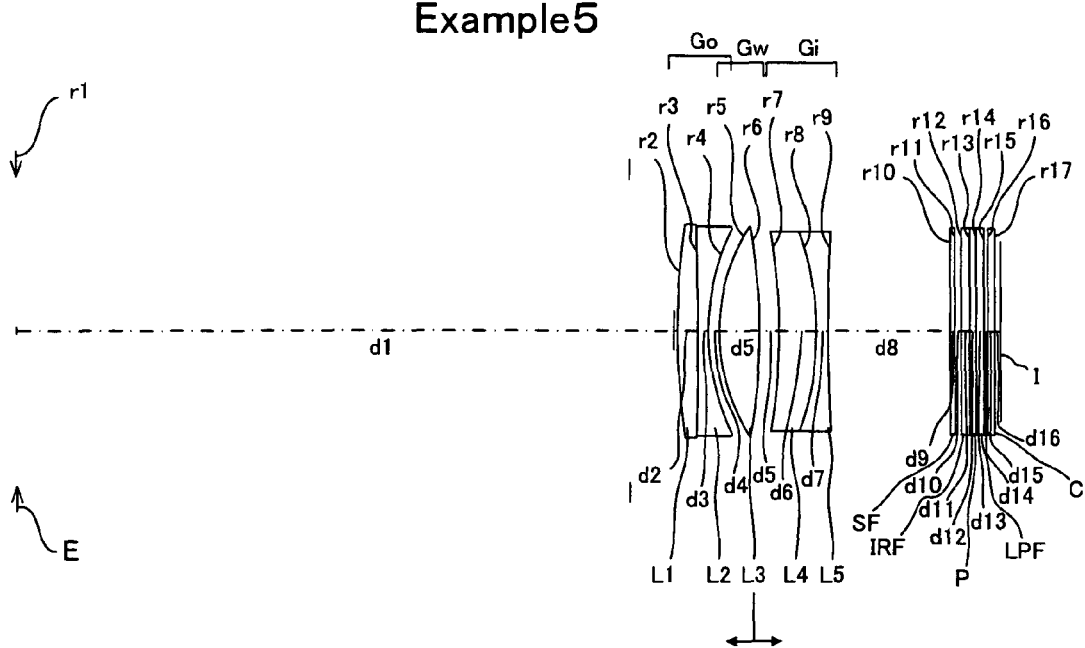
FIG. 5 is illustrative, as in FIG. 1, of Example 5 of the attachment lens device.

As shown in FIG. 5, the attachment lens device of Example 5 is built up of, in order from its object side, the entrance pupil E, the object-side lens group Go of negative refracting power, the wobbling lens group Gw of positive refracting power, and the image-side lens group Gi of negative refracting power.

The object-side lens group Go is made up of a cemented lens in which, in order from its object side, the first lens L1 that is a double-convex positive lens is cemented to the second lens L2 that is a double-concave negative lens. The wobbling lens group Gw is made up of the third lens L3 that is one double-convex positive lens. The image-side lens group Gi is made up of a cemented lens in which, in order from its object side, the fourth lens L4 that is a positive meniscus lens convex on its image side is cemented to the fifth lens L5 that is a double-concave negative lens.

The focal length is −234.41 mm.

Figure 6:
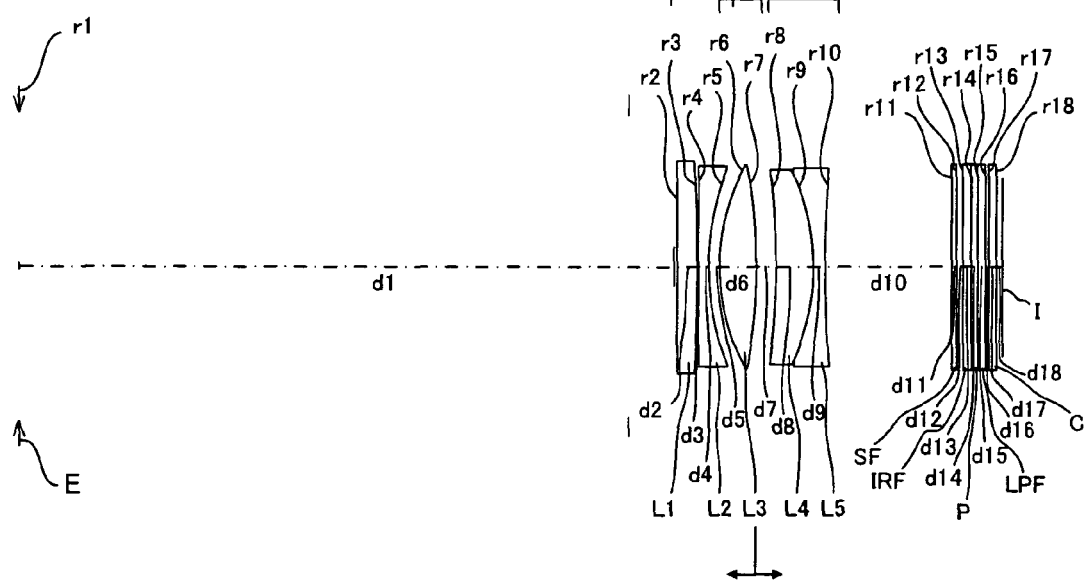
FIG. 6 is illustrative, as in FIG. 1, of Example 6 of the attachment lens device.

As shown in FIG. 6, the attachment lens device of Example 6 is built up of, in order from its object side, the entrance pupil E, the object-side lens group Go of negative refracting power, the wobbling lens group Gw of positive refracting power, and the image-side lens group Gi of negative refracting power.

The object-side lens group Go is made up of a cemented lens in which, in order from its object side, the first lens L1 that is a plano-convex positive lens convex on its image side is cemented to the second lens L2 that is a negative meniscus lens convex on its object side. The wobbling lens group Gw is made up of the third lens L3 that is one double-convex positive lens. The image-side lens group Gi is made up of a cemented lens in which, in order from its object side, the fourth lens L4 that is a positive meniscus lens convex on its image side is cemented to the fifth lens L5 that is a double-concave negative lens.

The focal length is −250.00 mm.

Figure 7:
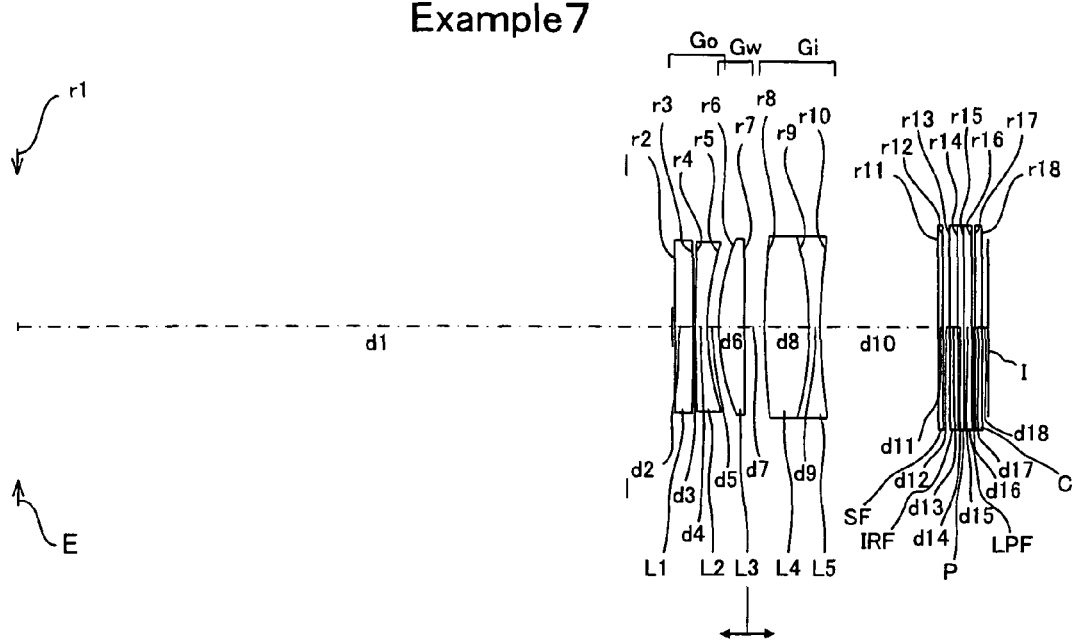
FIG. 7 is illustrative, as in FIG. 1, of Example 7 of the attachment lens device.

As shown in FIG. 7, the attachment lens device of Example 7 is built up of, in order from its object side, the entrance pupil E, the object-side lens group Go of negative refracting power, the wobbling lens group Gw of positive refracting power, and the image-side lens group Gi of negative refracting power.

The object-side lens group Go is made up of a cemented lens in which, in order from its object side, the first lens L1 that is a plano-convex positive lens convex on its image side is cemented to the second lens L2 that is a negative meniscus lens convex on its object side. The wobbling lens group Gw is made up of the third lens L3 that is one positive meniscus lens convex on its object side. The image-side lens group Gi is made up of a cemented lens in which, in order from its object side, the fourth lens L4 that is a double-convex positive lens is cemented to the fifth lens L5 that is a double-concave negative lens.

The focal length is −333.33 mm.

Figure 8:
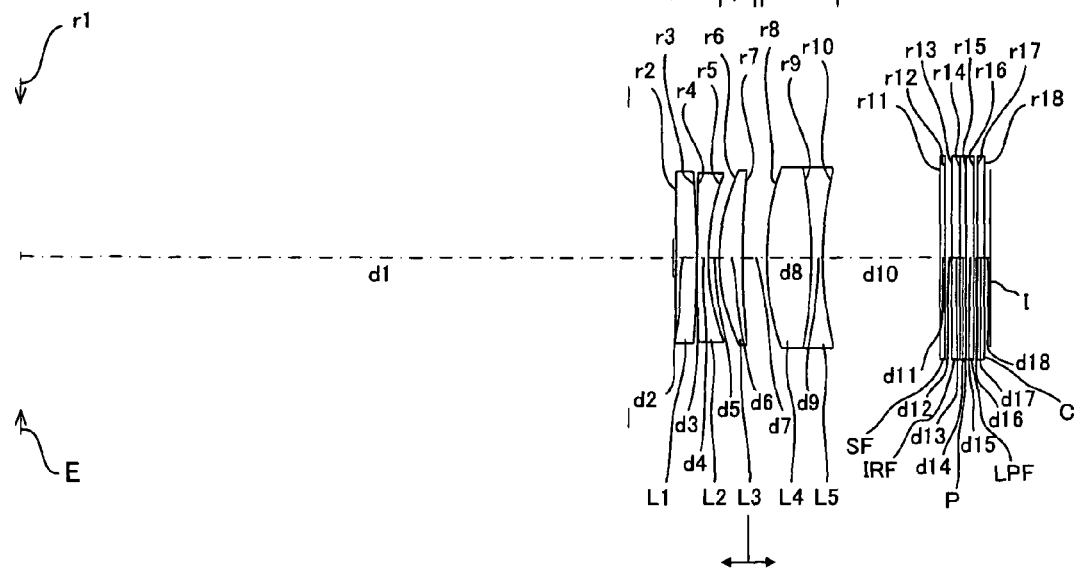
FIG. 8 is illustrative, as in FIG. 1, of Example 8 of the attachment lens device.
Figure 9:
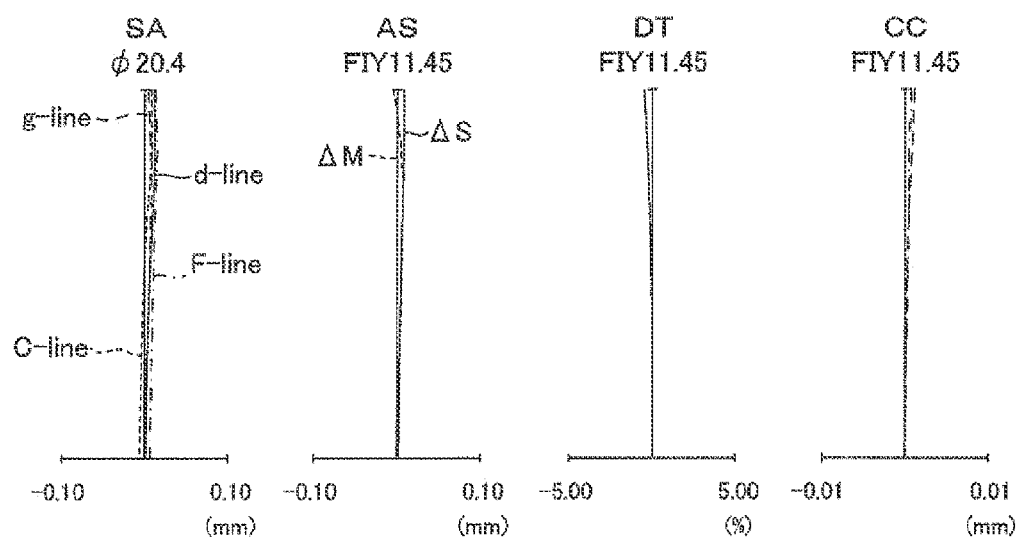
FIG. 9 is an aberration diagram for Example 1 upon focusing on an object point at infinity.
Figure 10:
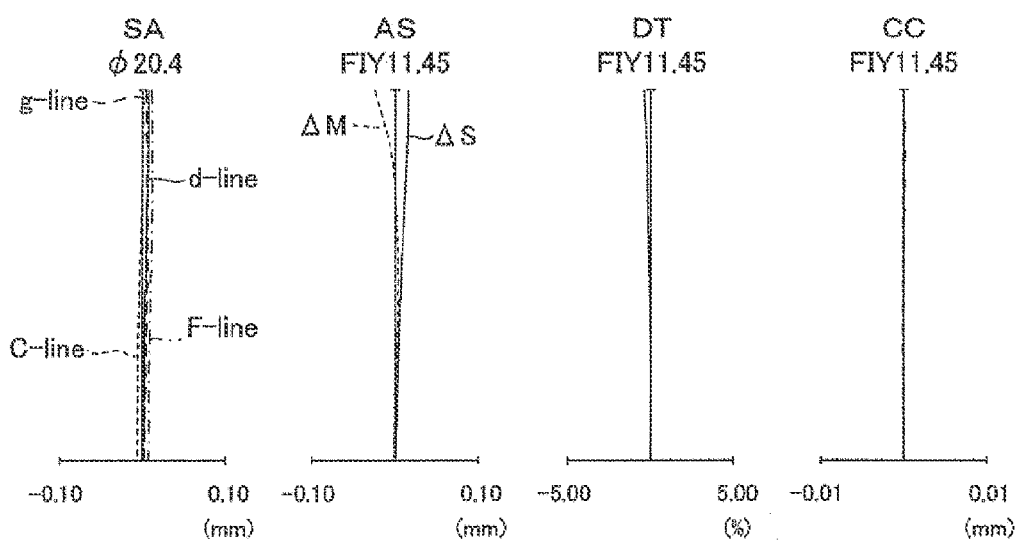
FIG. 10 is an aberration diagram for Example 2 upon focusing on an object point at infinity.
Figure 11:
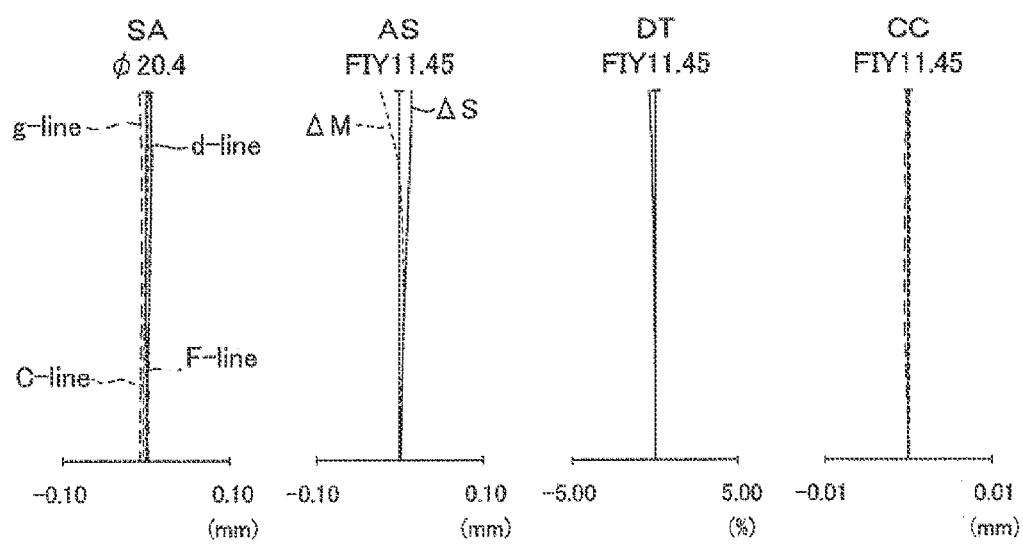
FIG. 11 is an aberration diagram for Example 3 upon focusing on an object point at infinity.
Figure 12:
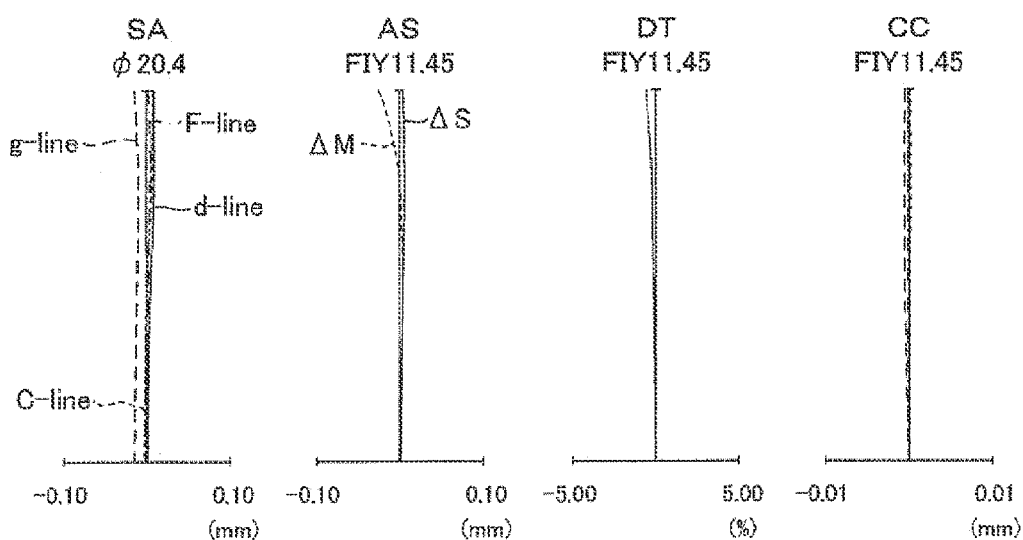
FIG. 12 is an aberration diagram for Example 4 upon focusing on an object point at infinity.
Figure 13:
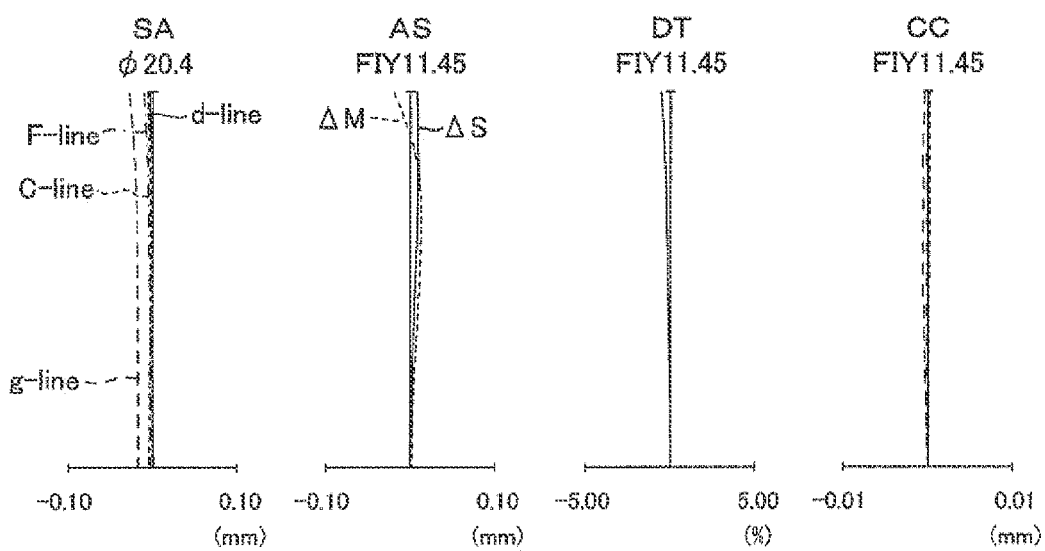
FIG. 13 is an aberration diagram for Example 5 upon focusing on an object point at infinity.
Figure 14:
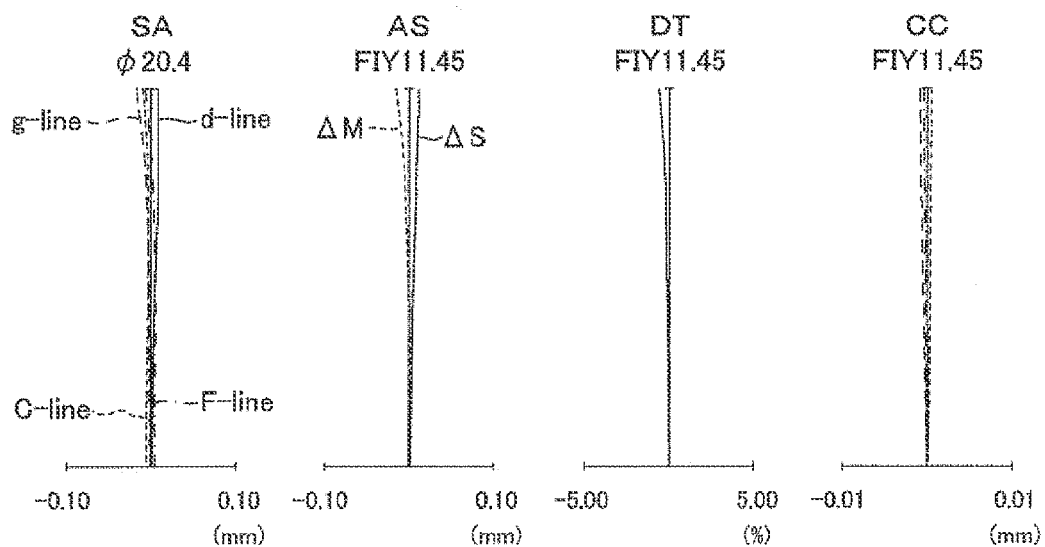
FIG. 14 is an aberration diagram for Example 6 upon focusing on an object point at infinity.
Figure 15:
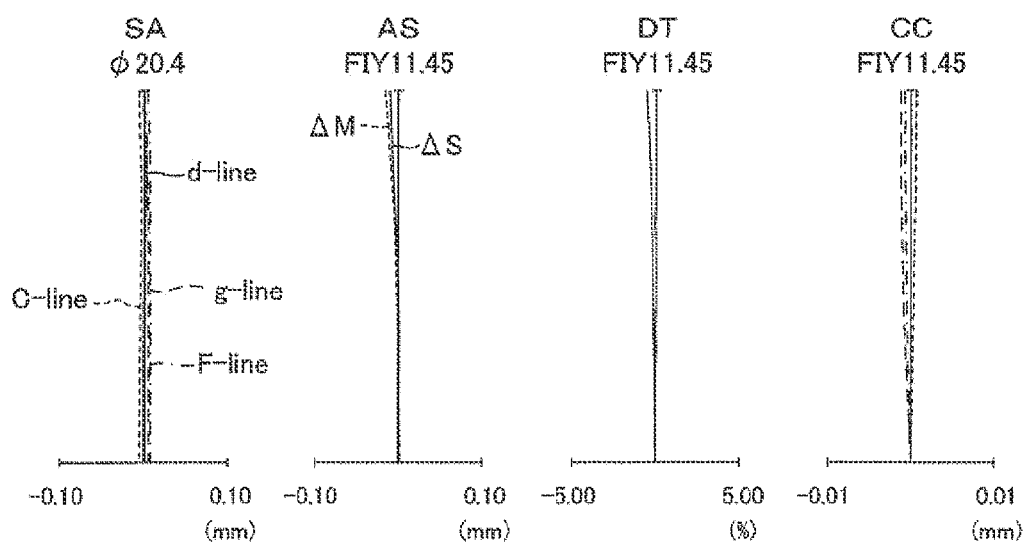
FIG. 15 is an aberration diagram for Example 7 upon focusing on an object point at infinity.
Figure 16:
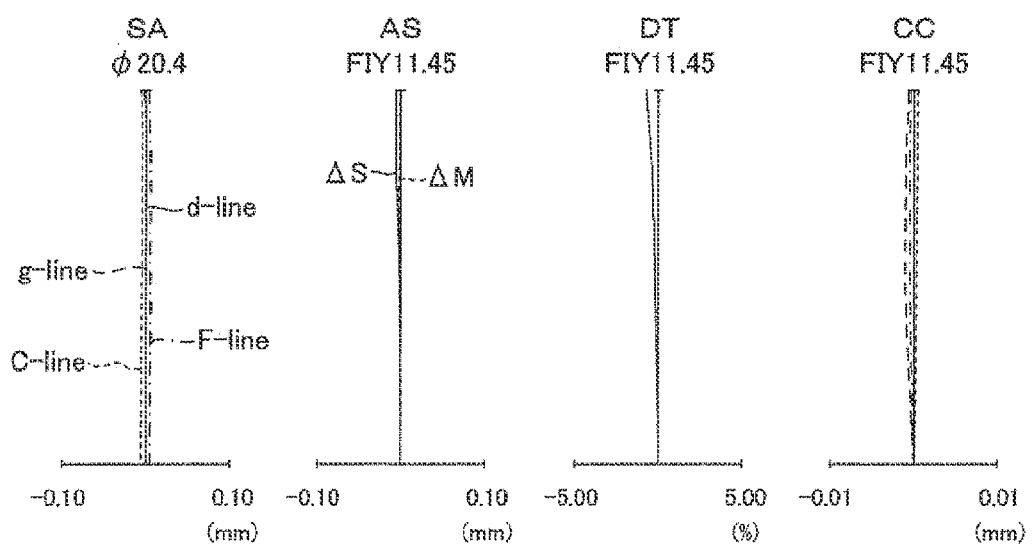
FIG. 16 is an aberration diagram for Example 8 upon focusing on an object point at infinity.

As shown in FIG. 8, the attachment lens device of Example 8 is built up of, in order from its object side, the entrance pupil E, the object-side lens group Go of negative refracting power, the wobbling lens group Gw of positive refracting power, and the image-side lens group Gi of negative refracting power.

The object-side lens group Go is made up of a cemented lens in which, in order from its object side, the first lens L1 that is a plano-convex positive lens convex on its image side is cemented to the second lens L2 that is a negative meniscus lens convex on its object side. The wobbling lens group Gw is made up of the third lens L3 that is one positive meniscus lens convex on its object side. The image-side lens group Gi is made up of a cemented lens in which, in order from its object side, the fourth lens L4 that is a double-convex positive lens is cemented to the fifth lens L5 that is a double-concave negative lens.

The focal length is −333.33 mm.

Set out below are numeral data on the lenses in Examples 1 to 8.

In the numeral lens data in the respective examples, r stands for the radius of curvature of each lens surface; d the thickness of, or the distance across, each lens; nd the d-line refractive index of each lens; and vd is the d-line Abbe constant of each lens.

NUMERAL EXAMPLE 1

Unit mm
Surface Data

| Surface No. | r | d | nd | vd | Effective Radius |
|---|---|---|---|---|---|
| 1 (Entrance Pupil) | ∞ | 79.8000 | | | 20.400 |
| 2 | 116.3233 | 2.6000 | 1.72151 | 29.23 | 13.500 |
| 3 | −207.0214 | 1.3000 | 1.81600 | 46.62 | |
| 4 | 37.2551 | 1.3000 | | | |
| 5 | 30.8689 | 6.0000 | 1.63980 | 34.46 | |
| 6 | −70.0901 | 2.0000 | | | |
| 7 | −81.6108 | 3.9000 | 1.57501 | 41.50 | |
| 8 | −38.4064 | 1.4000 | 1.84666 | 23.78 | |
| 9 | 159.2779 | 14.4630 | | | 12.500 |
| 10 | ∞ | 0.6500 | 1.51633 | 64.14 | |
| 11 | ∞ | 0.8500 | | | |
| 12 | ∞ | 0.8200 | 1.54424 | 70.86 | |
| 13 | ∞ | 0.7600 | 1.51300 | 64.12 | |
| 14 | ∞ | 1.0800 | 1.54424 | 70.86 | |
| 15 | ∞ | 0.4500 | | | |
| 16 | ∞ | 0.8000 | 1.50700 | 63.37 | |
| 17 | ∞ | 0.7449 | | | |
| Image Plane | ∞ | | | | |

NUMERAL EXAMPLE 2

Unit mm
Surface Data

| Surface No. | r | d | nd | vd | Effective Radius |
|---|---|---|---|---|---|
| 1 (Entrance Pupil) | ∞ | 79.8000 | | | 20.400 |
| 2 | 102.0368 | 2.6000 | 1.76182 | 26.52 | 13.500 |
| 3 | 9708.8671 | 1.3000 | 1.81600 | 46.62 | |
| 4 | 33.3571 | 1.3000 | | | |
| 5 | 29.2785 | 6.0000 | 1.63980 | 34.46 | |
| 6 | −91.4262 | 2.0000 | | | |
| 7 | −120.7795 | 3.9000 | 1.57501 | 41.50 | |
| 8 | −42.0370 | 1.4000 | 1.84666 | 23.78 | |
| 9 | 128.6072 | 14.4630 | | | 12.500 |
| 10 | ∞ | 0.6500 | 1.51633 | 64.14 | |
| 11 | ∞ | 0.8500 | | | |
| 12 | ∞ | 0.8200 | 1.54424 | 70.86 | |
| 13 | ∞ | 0.7600 | 1.51300 | 64.12 | |
| 14 | ∞ | 1.0800 | 1.54424 | 70.86 | |
| 15 | ∞ | 0.4500 | | | |
| 16 | ∞ | 0.8000 | 1.50700 | 63.37 | |
| 17 | ∞ | 0.7449 | | | |
| Image Plane | ∞ | | | | |

NUMERAL EXAMPLE 3

Unit mm
Surface Data

| Surface No. | r | d | nd | vd | Effective Radius |
|---|---|---|---|---|---|
| 1 (Entrance Pupil) | ∞ | 79.8000 | | | 20.400 |
| 2 | 101.2354 | 2.6000 | 1.76182 | 26.52 | 13.500 |
| 3 | −891.6014 | 1.3000 | 1.81600 | 46.62 | |
| 4 | 33.2613 | 1.3000 | | | |
| 5 | 29.2310 | 6.0000 | 1.63980 | 34.46 | |
| 6 | −95.3756 | 2.0000 | | | |
| 7 | −147.4489 | 3.9000 | 1.57501 | 41.50 | |
| 8 | −40.6757 | 1.4000 | 1.84666 | 23.78 | |
| 9 | 121.2908 | 14.4630 | | | 12.500 |
| 10 | ∞ | 0.6500 | 1.51633 | 64.14 | |
| 11 | ∞ | 0.8500 | | | |
| 12 | ∞ | 0.8200 | 1.54424 | 70.86 | |
| 13 | ∞ | 0.7600 | 1.51300 | 64.12 | |
| 14 | ∞ | 1.0800 | 1.54424 | 70.86 | |
| 15 | ∞ | 0.4500 | | | |
| 16 | ∞ | 0.8000 | 1.50700 | 63.37 | |
| 17 | ∞ | 0.7449 | | | |
| Image Plane | ∞ | | | | |

NUMERAL EXAMPLE 4

Unit mm
Surface Data

| Surface No. | r | d | nd | vd | Effective Radius |
|---|---|---|---|---|---|
| 1 (Entrance Pupil) | ∞ | 79.8000 | | | 20.400 |
| 2 | 148.0464 | 2.6000 | 1.78472 | 25.68 | 13.500 |
| 3 | −331.7733 | 1.3000 | 1.81600 | 46.62 | |
| 4 | 36.1412 | 1.3000 | | | |
| 5 | 29.9157 | 5.2000 | 1.63980 | 34.46 | |
| 6 | −80.4822 | 2.4000 | | | |
| 7 | −104.3532 | 4.5000 | 1.57501 | 41.50 | |
| 8 | −35.8890 | 1.4000 | 1.84666 | 23.78 | |
| 9 | 184.1042 | 14.4630 | | | 12.500 |
| 10 | ∞ | 0.6500 | 1.51633 | 64.14 | |
| 11 | ∞ | 0.8500 | | | |
| 12 | ∞ | 0.8200 | 1.54424 | 70.86 | |
| 13 | ∞ | 0.7600 | 1.51300 | 64.12 | |
| 14 | ∞ | 1.0800 | 1.54424 | 70.86 | |
| 15 | ∞ | 0.4500 | | | |
| 16 | ∞ | 0.8000 | 1.50700 | 63.37 | |
| 17 | ∞ | 0.7449 | | | |
| Image Plane | ∞ | | | | |

NUMERAL EXAMPLE 5

Unit mm
Surface Data

| Surface No. | r | d | nd | vd | Effective Radius |
|---|---|---|---|---|---|
| 1 (Entrance Pupil) | ∞ | 79.8000 | | | 20.400 |
| 2 | 100.9549 | 2.5000 | 1.84666 | 23.78 | 13.500 |
| 3 | −628.1783 | 1.3000 | 1.81600 | 46.62 | |
| 4 | 32.7420 | 1.4100 | | | |
| 5 | 27.8976 | 4.8000 | 1.58144 | 40.75 | |
| 6 | −86.1284 | 2.4000 | | | |
| 7 | −89.0633 | 4.5000 | 1.57501 | 41.50 | |
| 8 | −45.4504 | 1.4000 | 1.84666 | 23.78 | |
| 9 | 201.9062 | 14.4791 | | | 12.500 |
| 10 | ∞ | 0.6500 | 1.51633 | 64.14 | |
| 11 | ∞ | 0.8500 | | | |
| 12 | ∞ | 0.8200 | 1.54424 | 70.86 | |
| 13 | ∞ | 0.7600 | 1.51300 | 64.12 | |
| 14 | ∞ | 1.0800 | 1.54424 | 70.86 | |
| 15 | ∞ | 0.4500 | | | |
| 16 | ∞ | 0.8000 | 1.50700 | 63.37 | |
| 17 | ∞ | 0.7450 | | | |
| Image Plane | ∞ | | | | |

NUMERAL EXAMPLE 6

Unit mm
Surface Data

| Surface No. | r | d | nd | vd | Effective Radius |
|---|---|---|---|---|---|
| 1 (Entrance Pupil) | ∞ | 79.8000 | | | 20.400 |
| 2 | ∞ | 2.5000 | 1.84666 | 23.78 | 13.500 |
| 3 | −267.8234 | 0.1000 | | | |
| 4 | 1239.5973 | 1.3000 | 1.81600 | 46.62 | |
| 5 | 38.1003 | 1.4100 | | | |
| 6 | 30.5958 | 4.4000 | 1.68893 | 31.07 | 13.000 |
| 7 | −84.8237 | 2.4000 | | | |
| 8 | −114.4129 | 4.5000 | 1.57501 | 41.50 | |
| 9 | −33.1132 | 1.4000 | 1.84666 | 23.78 | |
| 10 | 161.7793 | 15.0876 | | | 12.500 |

-continued

Unit mm
Surface Data

| Surface No. | r | d | nd | vd | Effective Radius |
|---|---|---|---|---|---|
| 11 | ∞ | 0.6500 | 1.51633 | 64.14 | |
| 12 | ∞ | 0.8500 | | | |
| 13 | ∞ | 0.8200 | 1.54424 | 70.86 | |
| 14 | ∞ | 0.7600 | 1.51300 | 64.12 | |
| 15 | ∞ | 1.0800 | 1.54424 | 70.86 | |
| 16 | ∞ | 0.4500 | | | |
| 17 | ∞ | 0.8000 | 1.50700 | 63.37 | |
| 18 | ∞ | 0.7450 | | | |
| Image Plane | ∞ | | | | |

NUMERAL EXAMPLE 7

Unit mm
Surface Data

| Surface No. | r | d | nd | vd | Effective Radius |
|---|---|---|---|---|---|
| 1 (Entrance Pupil) | ∞ | 79.8000 | | | 20.400 |
| 2 | ∞ | 2.5000 | 1.84666 | 23.78 | 13.500 |
| 3 | −199.2176 | 0.1000 | | | |
| 4 | 485.6645 | 1.3000 | 1.81600 | 46.62 | |
| 5 | 37.8752 | 1.4100 | | | |
| 6 | 31.1952 | 3.2000 | 1.68893 | 31.07 | |
| 7 | 1.072E+04 | 2.4000 | | | |
| 8 | 107.1549 | 5.5000 | 1.57501 | 41.50 | |
| 9 | −48.6897 | 1.4000 | 1.84666 | 23.78 | |
| 10 | 80.2652 | 14.3195 | | | 11.500 |
| 11 | ∞ | 0.6500 | 1.51633 | 64.14 | |
| 12 | ∞ | 0.8500 | | | |
| 13 | ∞ | 0.8200 | 1.54424 | 70.86 | |
| 14 | ∞ | 0.7600 | 1.51300 | 64.12 | |
| 15 | ∞ | 1.0800 | 1.54424 | 70.86 | |
| 16 | ∞ | 0.4500 | | | |
| 17 | ∞ | 0.8000 | 1.50700 | 63.37 | |
| 18 | ∞ | 0.7450 | | | |
| Image Plane | ∞ | | | | |

NUMERAL EXAMPLE 8

Unit mm
Surface Data

| Surface No. | r | d | nd | vd | Effective Radius |
|---|---|---|---|---|---|
| 1 (Entrance Pupil) | ∞ | 79.8000 | | | 20.400 |
| 2 | ∞ | 2.5000 | 1.84666 | 23.78 | 13.500 |
| 3 | −158.5179 | 0.1000 | | | |
| 4 | 353.1511 | 1.3000 | 1.81600 | 46.62 | |
| 5 | 33.0034 | 1.4100 | | | |
| 6 | 29.2862 | 2.7300 | 1.68893 | 31.07 | |
| 7 | 112.5882 | 2.9300 | | | |
| 8 | 40.0494 | 5.5000 | 1.57501 | 41.50 | 11.500 |
| 9 | −73.3603 | 1.4000 | 1.84666 | 23.78 | |
| 10 | 54.0416 | 14.2621 | | | 11.500 |
| 11 | ∞ | 0.6500 | 1.51633 | 64.14 | |
| 12 | ∞ | 0.8500 | | | |
| 13 | ∞ | 0.8200 | 1.54424 | 70.86 | |
| 14 | ∞ | 0.7600 | 1.51300 | 64.12 | |
| 15 | ∞ | 1.0800 | 1.54424 | 70.86 | |
| 16 | ∞ | 0.4500 | | | |
| 17 | ∞ | 0.8000 | 1.50700 | 63.37 | |
| 18 | ∞ | 0.7450 | | | |
| Image Plane | ∞ | | | | |

The aberration diagrams for Examples 1 to 8 are attached hereto as FIGS. 9 to 16 in which SA, AS, DT and CC are indicative of spherical aberrations, astigmatisms, distortions and chromatic aberrations of magnification, respectively, and φ and FIY stand for an entrance pupil and an image height, respectively. In the diagrams for spherical aberrations and chromatic aberrations of magnification, solid lines, long-dots lines, short-dots lines and one-dot lines are indicative of the amounts of aberrations on d-line, g-line, C-line and F-line bases, and in the diagrams for astigmatisms, solid lines S and dotted lines M are representative of sagittal image surface and meridional image surface (mm), respectively. In the diagrams for distortions, solid lines are indicative of d-line distortions (%).

The master lens mounted on the attachment lens device is now explained.

The focusing lens group in the master lens ML is defined by the whole optical system of the master lens ML minus filters, etc. For focusing at close range, the whole optical system of the master lens ML is let out. For the purpose of simplifying the mechanisms involved, the optical system may be moved as an integral piece. For the purpose of reducing aberrations upon focusing at close range, on the other hand, floating may be implemented by a variable spacing provided in the master lens ML. The focusing lens group may also be defined by some lens groups in the master lens ML.

Figure 17:
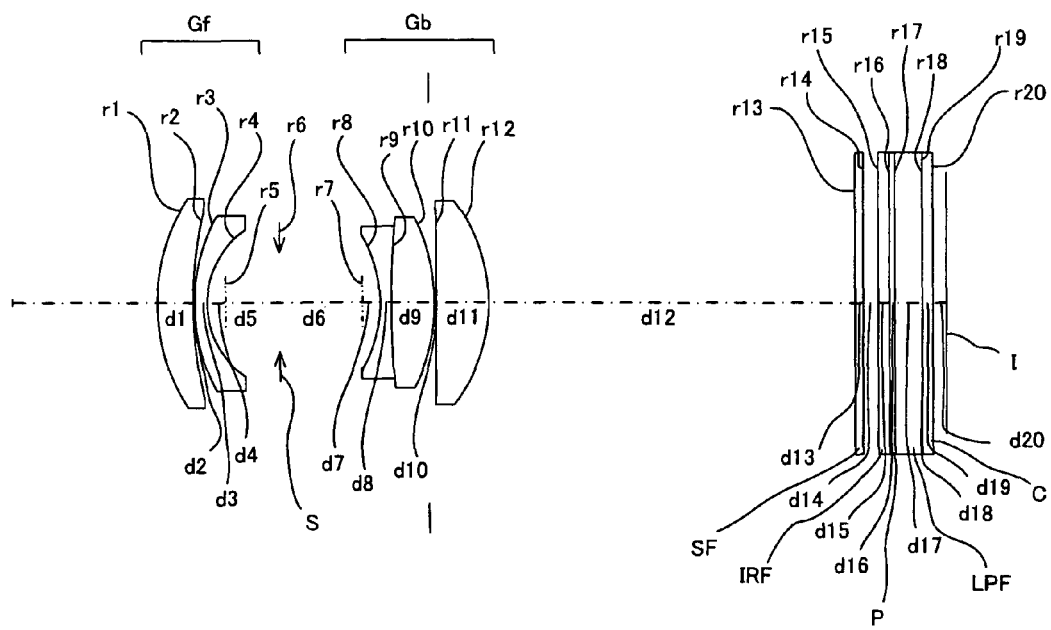
FIG. 17 is illustrative in lens section of the master lens.
Figure 18:
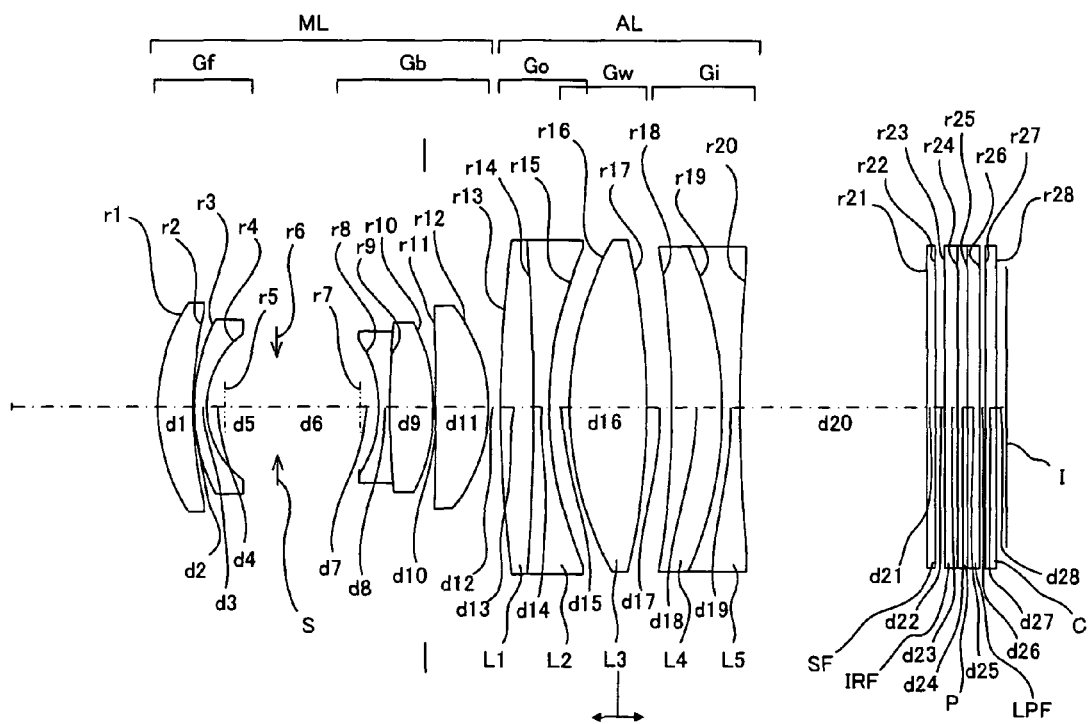
FIG. 18 is illustrative in lens section of one exemplary application of the attachment lens device of Example 1 to the master lens.

FIGS. 17 and 18 are illustrative in lens section of one exemplary master lens and one exemplary attachment of the attachment lens device of Example 1 to that master lens, respectively.

In FIGS. 17 and 18, ML stands for the master lens; Gf a front group; S the aperture stop; Gb a rear group; AL an attachment lens; Go the object-side lens group; Gw the wobbling lens group; Gi the image-side lens group; SF the ultrasonic filter; IRF the IR cut filter; P the plane-parallel plate; LPF the optical low-pass filter; C the cover glass an electronic imaging device CCD; and I the image plane of CCD. It is here to be noted that the plane-parallel plate is used to make up for a change in the thickness of the LPF varying depending on an image pitch.

As shown in FIG. 17, the master lens is built up of, in order from its object side, the front group Gf, the aperture stop S, and the rear group Gb.

The front group Gf is made up of, in order from its object side, a positive meniscus lens convex on its object side and a negative meniscus lens convex on its object side. The rear group Gb is made up of, in order from its object side, a cemented lens in which a double-concave negative lens and a double-convex positive lens are cemented together, and a double-convex positive lens.

Focusing is implemented by integral movement of the front group Gf, aperture stop S and rear group Gb, thereby varying the spaces between 12 surfaces.

The focal length is 25.4 mm, and the F-number is 2.88.

As shown in FIG. 18, one exemplary attachment of the attachment lens device to the master lens is comprised of, in order from its object side, the master lens ML and the attachment lens device AL. The master lens ML here is built up of, in order from its object side, the front group Gf, the aperture stop S, and the rear group Gb. The attachment lens device is built up of, in order from its object side, the object-side lens group Go of negative refracting power, the wobbling lens group Gw of positive refracting power, and the image-side lens group Gi of negative refracting power.

The front group Gf in the master lens ML is made up of, in order from its object side, a positive meniscus lens convex on its object side and a negative meniscus lens convex on its object side. The rear group Gb in the master lens ML is made up of, in order from its object side, a cemented lens in which a double-concave negative lens and a double-convex positive lens are cemented together, and a double-convex positive lens.

The object-side lens group Go in the attachment lens device Al is made up of a cemented lens in which, in order from its objet side, the first lens L1 that is a double-convex positive lens and the second lens L2 that is a double-concave negative lens are cemented together. The wobbling lens group Gw in the attachment lens device AL is made up of the third lens L3 that is one double-convex positive lens. The image-side lens group Gi in the attachment lens device AL is made up of a cemented lens in which, in order from its object side, the fourth lens L4 that is a positive meniscus lens convex on its image side and the fifth lens L5 that is a double-concave negative lens are cemented together.

A mount surface where the attachment lens device Al is joined to the master lens ML lies on the object side at a position of 5.8 mm away from the 13$^{th}$ surface. Although there are no specific data provided on other attachment lens device AL/master lens ML combinations, it is to be understood that the mount surface again lies on the object side at a position of 5.8 mm away from the 13$^{th}$ surface. Of course, the above is nothing but one example of the master lens arrangement; lens arrangements of other specifications may be used as the master lens.

The focal length is 26.1 mm, and the F-number is 2.95.

Set out below are numeral lens data on the exemplary master lens and the exemplary attachment of the attachment lens device of Example 1 to that master lens.

In the numeral lens data in the respective examples, r stands for the radius of curvature of each lens surface; d the thickness of, or the distance across, each lens; nd the d-line refractive index of each lens; and vd is the d-line Abbe constant of each lens.

Master Lens

Unit mm
Surface Data

| Surface No. | r | d | nd | vd | Effective Radius |
|---|---|---|---|---|---|
| 1 | 17.0643 | 2.8000 | 1.80610 | 33.27 | |
| 2 | 36.4654 | 0.1300 | | | |
| 3 | 16.3558 | 0.9500 | 1.69680 | 55.53 | |
| 4 | 7.9657 | 1.5620 | | | |
| 5 (Virtual Surface) | ∞ | 4.0071 | | | |
| 6 (Stop) | ∞ | 6.1963 | | | 4.158 |
| 7 (Virtual Surface) | ∞ | 1.5000 | | | 4.900 |
| 8 | −10.5840 | 0.8300 | 1.75520 | 27.51 | |
| 9 | 84.6657 | 3.3600 | 1.69680 | 55.53 | |
| 10 | −16.6108 | 0.1500 | | | 6.600 |
| 11$ | 670.6095 | 4.2000 | 1.74250 | 49.30 | |
| 12$ | −13.7699 | 28.3910 | | | |
| 13 | ∞ | 0.6200 | 1.51633 | 64.14 | |
| 14 | ∞ | 1.2100 | | | |
| 15 | ∞ | 0.8200 | 1.54424 | 70.86 | |
| 16 | ∞ | 0.4500 | 1.54200 | 77.40 | |
| 17 | ∞ | 1.9800 | 1.54424 | 70.86 | |
| 18 | ∞ | 0.1500 | | | |
| 19 | ∞ | 0.7600 | 1.52310 | 54.49 | |
| 20 | ∞ | 1.0600 | | | |
| Image Plane | ∞ | | | | |

Master Lens+Example 1

Unit mm
Surface Data

| Surface No. | r | d | nd | vd | Effective Radius |
|---|---|---|---|---|---|
| 1 | 17.0643 | 2.8000 | 1.80610 | 33.27 | |
| 2 | 36.4654 | 0.1300 | | | |
| 3 | 16.3558 | 0.9500 | 1.69680 | 55.53 | |
| 4 | 7.9657 | 1.5620 | | | |
| 5 (Virtual Surface) | ∞ | 4.0071 | | | |
| 6 (Stop) | ∞ | 6.1963 | | | 4.158 |
| 7 (Virtual Surface) | ∞ | 1.5000 | | | 4.900 |
| 8 | −10.5840 | 0.8300 | 1.75520 | 27.51 | |
| 9 | 84.6657 | 3.3600 | 1.69680 | 55.53 | |
| 10 | −16.6108 | 0.1500 | | | 6.600 |
| 11$ | 670.6095 | 4.2000 | 1.74250 | 49.30 | |
| 12$ | −13.7699 | 28.3910 | | | |
| 13 | 116.3233 | 2.6000 | 1.72151 | 29.23 | 13.500 |
| 14 | −207.0214 | 1.3000 | 1.81600 | 46.62 | |
| 15 | 37.2551 | 1.3000 | | | |
| 16 | 30.8689 | 6.0000 | 1.63980 | 34.46 | |
| 17 | −70.0901 | 2.0000 | | | |
| 18 | −81.6108 | 3.9000 | 1.57501 | 41.50 | |
| 19 | −38.4064 | 1.4000 | 1.84666 | 23.78 | |
| 20 | 159.2779 | 14.4630 | | | 12.500 |
| 21 | ∞ | 0.6500 | 1.51633 | 64.14 | |
| 22 | ∞ | 0.8500 | | | |
| 23 | ∞ | 0.8200 | 1.54424 | 70.86 | |
| 24 | ∞ | 0.7600 | 1.51300 | 64.12 | |
| 25 | ∞ | 1.0800 | 1.54424 | 70.86 | |
| 26 | ∞ | 0.4500 | | | |
| 27 | ∞ | 0.8000 | 1.50700 | 63.37 | |
| 28 | ∞ | 0.7480 | | | |
| Image Plane | ∞ | | | | |

It is here to be noted that 28.3910 at the 12$^{th}$ surface is a clerical error. The back focus (length calculated on an air basis) for the master lens only is the same regardless of the presence or absence of the attachment lens; that is, the space between the 12$^{th}$ and the 13$^{th}$ surface is found by calculation to be 2.2012 from data at [0118] and [0119].

Figure 19:
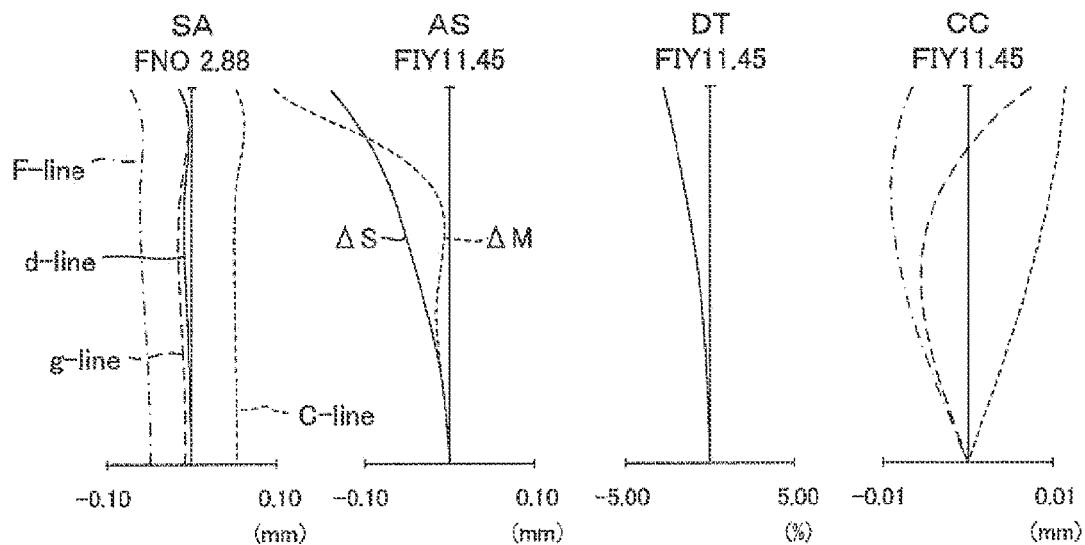
FIG. 19 is an aberration diagram for the master lens upon focusing on an object point at infinity.
Figure 20:
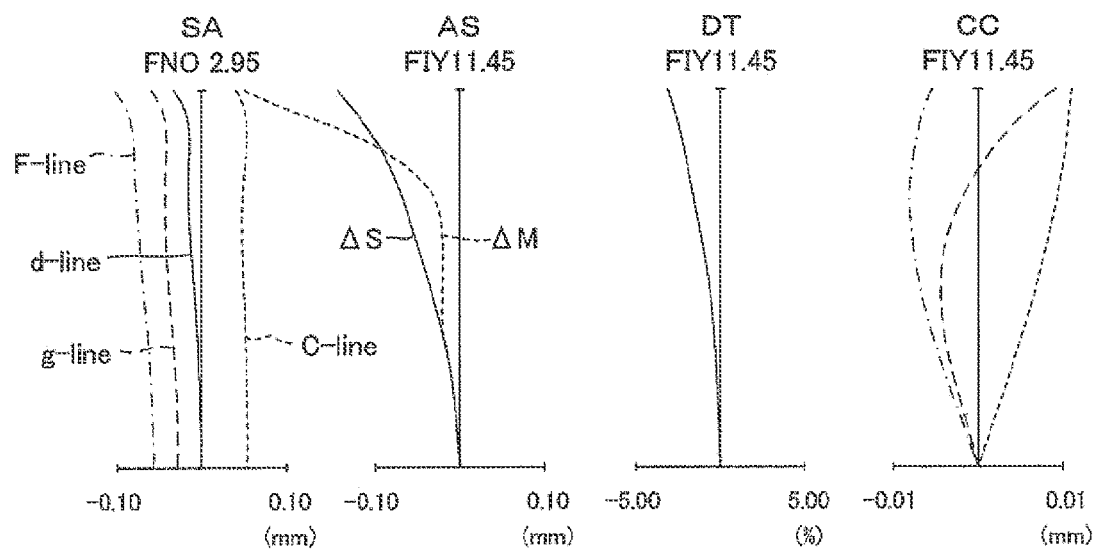
FIG. 20 is an aberration diagram for one exemplary application of the attachment lens device of Example 1 to the master lens upon focusing on an object point at infinity.

The aberration diagrams for the above master lens and the exemplary attachment of the attachment lens device of Example 1 to that master lens are attached hereto as FIGS. 19 and 20 in which SA, AS, DT and CC are indicative of spherical aberrations, astigmatisms, distortions and chromatic aberrations of magnification, respectively, and FNO and FIY stand for an F-number and an image height, respectively.

Set out below are the values of the respective conditions and Conditions (1) to (10) in the above respective examples.

Fno (ML) is indicative of the F-number of the master lens ML. The value of $Dwob/(Fno \times \beta w \times \epsilon)$ is controlled in such a way as to be kept substantially constant regardless of the state of the master lens ML (F-number changes such as a change in the aperture area of the aperture stop S), and master lens ML replacement.

Further, it is contemplated that where the master lens ML has an F-number of 4.0, there is a value obtained that is half the extent of movement of the wobbling lens group in a state with an F-number of 8.0. The wobbling extent is set such that the maximum extent of movement is obtained in a state where the master lens ML has an F-number of 8.0; such an extent-of-movement setting works in favor of size reductions.

| | Example 1 | Example 2 | Example 3 | Example 4 |
|---|---|---|---|---|
| Dwob(Fno(ML) = 8.0) | 0.080 | 0.085 | 0.085 | 0.080 |
| Fno(Fno(ML) = 8.0) | 8.214 | 8.230 | 8.235 | 8.250 |
| Dwob(Fno(ML) = 4.0) | 0.040 | 0.043 | 0.043 | 0.040 |
| Fno(Fno(ML) = 4.0) | 4.107 | 4.115 | 4.117 | 4.125 |
| $\beta w$ ... (3) | 1.027 | 1.029 | 1.029 | 1.031 |
| $\epsilon$ | 0.01115 | 0.01115 | 0.01115 | 0.01115 |
| L | 22.3 | 22.3 | 22.3 | 22.3 |
| $\phi w$ | 0.0292 | 0.0283 | 0.0281 | 0.0288 |
| $\phi O$ | −0.0159 | −0.0166 | −0.0167 | −0.0171 |
| $\phi I$ | −0.0197 | −0.0180 | −0.0177 | −0.0179 |
| RwO | 30.8689 | 29.2785 | 29.2310 | 29.9157 |
| RwI | −70.0901 | −91.4262 | −95.3756 | −80.4822 |
| ROI | 37.2551 | 33.3571 | 33.2613 | 36.1412 |
| RIO | −81.6108 | −120.7795 | −147.4489 | −104.3532 |
| vOp | 29.23 | 26.52 | 26.52 | 25.68 |
| vOn | 46.62 | 46.62 | 46.62 | 46.62 |
| vIp | 41.5 | 41.5 | 41.5 | 41.5 |
| vIn | 23.78 | 23.78 | 23.78 | 23.78 |
| $Dwob/(Fno \times \beta w \times \epsilon)$ (Fno(ML) = 8.0) ... (1), (2) | 0.851 | 0.900 | 0.900 | 0.844 |
| $Dwob/(Fno \times \beta w \times \epsilon)$ (Fno(ML) = 4.0) ... (1), (2) | 0.851 | 0.911 | 0.910 | 0.844 |
| $\phi w/(\phi O + \phi I)$ ... (4) | −0.820 | −0.817 | −0.815 | −0.822 |
| $\phi O/\phi I$ ... (5) | 0.805 | 0.921 | 0.939 | 0.955 |
| (RwO + RwI)/(RwO − RwI) ... (6) | −0.388 | −0.515 | −0.531 | −0.458 |
| ROI/RwO ... (7) | 1.207 | 1.139 | 1.138 | 1.208 |
| RwI/RIO ... (8) | 0.859 | 0.757 | 0.647 | 0.771 |
| vOp − vOn ... (9) | −17.39 | −20.1 | −20.1 | −20.94 |
| vIp − vIn ... (10) | 17.72 | 17.72 | 17.72 | 17.72 |

| | Example 5 | Example 6 | Example 7 | Example 8 |
|---|---|---|---|---|
| Dwob(Fno(ML) = 8.0) | 0.085 | 0.080 | 0.120 | 0.170 |
| Fno(Fno(ML) = 8.0) | 8.236 | 8.226 | 7.975 | 7.990 |
| Dwob(Fno(ML) = 4.0) | 0.043 | 0.040 | 0.060 | 0.085 |
| Fno(Fno(ML) = 4.0) | 4.118 | 4.113 | 3.988 | 3.995 |
| $\beta w$ ... (3) | 1.029 | 1.028 | 0.997 | 0.999 |
| $\epsilon$ | 0.01115 | 0.01115 | 0.01115 | 0.01115 |
| L | 22.3 | 22.3 | 22.3 | 22.3 |
| $\phi w$ | 0.0272 | 0.0302 | 0.0220 | 0.0176 |
| $\phi O$ | −0.0161 | −0.0175 | −0.0155 | −0.0169 |
| $\phi I$ | −0.0169 | −0.0187 | −0.0105 | −0.0039 |
| RwO | 27.8976 | 30.5958 | 31.1952 | 29.2862 |
| RwI | −86.1284 | −84.8237 | 10720.0000 | 112.5882 |
| ROI | 32.7420 | 38.1003 | 37.8752 | 33.0034 |
| RIO | −89.0633 | −114.4129 | −107.1549 | 40.0494 |
| vOp | 23.78 | 23.78 | 23.78 | |
| vOn | 46.62 | 46.62 | 46.62 | |
| vIp | 41.5 | 41.5 | 41.5 | |
| vIn | 23.78 | 23.78 | 23.78 | |
| $Dwob/(Fno \times \beta w \times \epsilon)$ (Fno(ML) = 8.0) ... (1), (2) | 0.900 | 0.848 | 1.354 | 1.910 |
| $Dwob/(Fno \times \beta w \times \epsilon)$ (Fno(ML) = 4.0) ... (1), (2) | 0.910 | 0.848 | 1.353 | 1.910 |
| $\phi w/(\phi O + \phi I)$ ... (4) | −0.826 | −0.832 | −0.848 | −0.846 |
| $\phi O/\phi I$ ... (5) | 0.953 | 0.937 | 1.483 | 4.326 |
| (RwO + RwI)/(RwO − RwI) ... (6) | −0.511 | −0.470 | −1.006 | −1.703 |
| ROI/RwO ... (7) | 1.174 | 1.245 | 1.214 | 1.127 |
| RwI/RIO ... (8) | 0.967 | 0.741 | 100.042 | 2.811 |
| vOp − vOn ... (9) | −22.84 | −22.84 | −22.84 | |
| vIp − vIn ... (10) | 17.72 | 17.72 | 17.72 | |

The imaging apparatus incorporating the attachment device is now explained.

Figure 21:
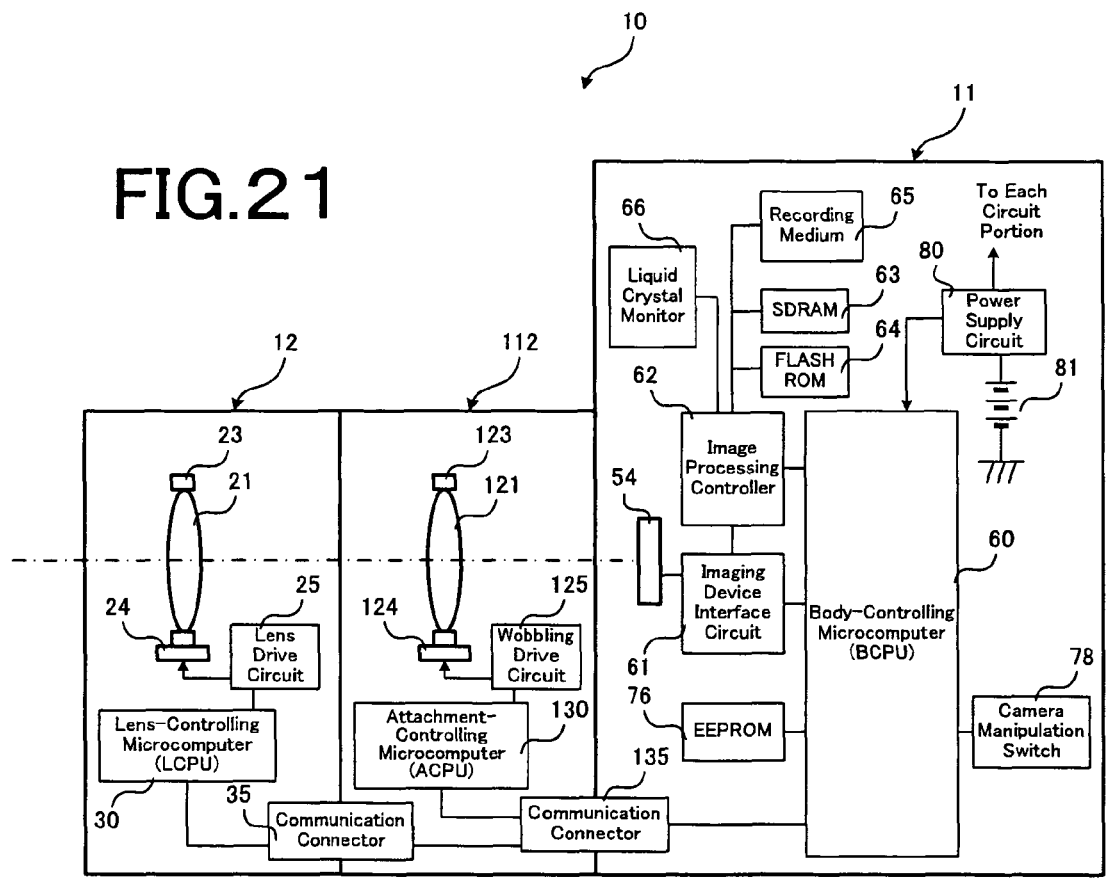
FIG. 21 is a block diagram for the imaging apparatus and system.

FIG. 21 is a block diagram for the imaging apparatus.

The imaging apparatus 10 is built up of a body unit 11 serving as the camera body, a lens unit 12 serving as the master lens that is attachable to or detachable from the body unit 11, and an attachment 112 serving as the attachment device that is capable of being inserted or de-inserted between the body unit 11 and the lens unit 12.

The lens unit 12 is detachably mounted on the body unit 11 via a lens mount provided on the front surface of the body unit 11. This lens unit 12 is made up of an image-taking lens including a focus lens 21, a lens barrel 23, a lens drive mechanism 24, a lens drive circuit 25, and a lens-controlling microcomputer (LCPU for short) 30.

The focus lens 21 is supported by the lens barrel 23. As a stepping motor encased in the lens drive mechanism 24 is driven to move the lens barrel 23 along the optical axis direction, it causes movement of the focus lens 21 in the optical axis direction. The lens drive circuit 25 is actuated in response to a control signal from the LCPU 30 to move the lens barrel 23 via the lens drive mechanism 24.

The LCPU 30 controls the parts in the lens unit 12 such as the lens drive circuit 25. This LCPU 30 is electrically connected to a body-controlling microcomputer (BCPU for short) 60 on the body unit 11 side via a communication connector 35 working as a communication portion, and controlled pursuant to a command from that BCPU 60.

The attachment 112 is detachably mounted on the body unit 11 via the lens mount provided on the front surface of the body unit 11. The attachment 112 is also provided with a lens mount by which the lens unit 12 is detachably mounted in place.

The attachment 112 is built up of a wobbling lens group 121 serving as the focus lens, a lens barrel 123, a lens drive mechanism 124, a wobbling drive circuit 125, and an attachment-controlling microcomputer (ACPU for short) 130.

The wobbling lens group 121 is supported by the lens barrel 123. A stepping motor encased in the wobbling drive mechanism 124 is driven to move the lens barrel 123 along the optical axis direction thereby moving the wobbling lens group 121. Pursuant to a control signal from the ACPU 130, the wobbling drive circuit 125 is actuated to move the lens barrel 123 so that the wobbling lens group 121 can be moved in the optical axis direction via the wobbling drive mechanism 124.

The ACPU 130 controls the parts in the attachment 112 such as the wobbling drive circuit 125. This ACPU 130 is electrically connected to the BCPU 60 on the body unit 11 side via a communication connector 135 serving as a communication portion, and controlled pursuant to a command from that BCPU 60.

It is here to be noted that when the attachment 112 is mounted between the body unit 11 and the lens unit 12 as shown in FIG. 21, there is a communicatable, electrical connection made between the BCPU 60 and the LCPU 30 via the communication connectors 35 and 135. Communication of the LCPU 30 with the BCPU 60 takes place via the communication connectors 35 and 135. It is here to be noted that communication at the communication portion may rely upon optical connection or noncontact connection such as wireless connection.

Communications between the LCPU 30, ACPU 130 and BCPU 60 may be wirelessly implemented.

In the body unit 11, an imaging device 54 for photoelectric transformation of an object image passing through an imaging lens such as the focus lens 21 in the lens unit 12 is provided on the optical axis of the imaging lens.

Housed in the body unit 11 are an imaging device interface circuit 61 connected to the imaging device 64, an SDRAM 63 and flash ROM 64 provided as a memory area, a recording medium 65, a liquid crystal monitor 66 and an image processing controller 62 for implementing image processing.

The image processing controller 62 is connected with the imaging device interface circuit 61, SDRAM 63, flash ROM 64, recording medium 65, and liquid crystal monitor 66. These are designed to provide an electronically imaging function along with an electronically recording/displaying function.

The recording medium 65 that is an external recording medium such as various memory cards or an outboard hard disc drive (HDD) is mounted on the camera body unit 11 in a communicatable, inter-changeable fashion.

The BCPU 60 is connected with the communication connector 135, the image processing controller 62, a nonvolatile memory EEPROM 76, etc.

The image processing controller 62 controls the imaging device interface circuit 61 pursuant to a command from the BCPU 60 to capture image data from the imaging device 54 in it. The image data are then converted by the image processing controller 62 into video signals that are in turn produced as a live view on the liquid crystal monitor 66. The camera operator could see a live view image on the liquid crystal monitor 66 to envisage the composition of the picture to be taken. It is also possible to display the taken and recorded image on the liquid crystal monitor 66 for checkup purposes.

The SDRAM 63 that is a temporal storage memory for image data is used as a work area or the like upon transformation of image data. Such image data are set such that after subjected to a variety of image processing, for instance, transformation of still images into JPEG data, they are going to be stored in the recording medium 65. On the other hand, the BCPU 60 is connected with a camera manipulation switch assembly (SW) 78, and a battery 81 via a power supply circuit 80.

The EEPROM 76 works as other storage area to store the given control parameters needed for camera control, and is provided in such a way as to gain access from the BCPU 60.

The camera manipulation switch assembly 78 is built up of a switch group typically comprising a release switch for commanding implementation of imaging operation, a mode switch for switching between a still image-taking mode, a moving image-taking mode and an image recording/displaying mode, a switch for setting off the taking of moving images, and a power switch or the like inclusive of the manipulation button needed for operation of the imaging apparatus. The release switch works as the first or half-push release switch (1RSW), and as the second or full-push release switch (2RSW).

The power supply circuit 80 is provided so as to supply the output power of the battery 81 while it is converted into the voltage necessary for each of the circuit portions constituting the imaging apparatus.

Figure 22:
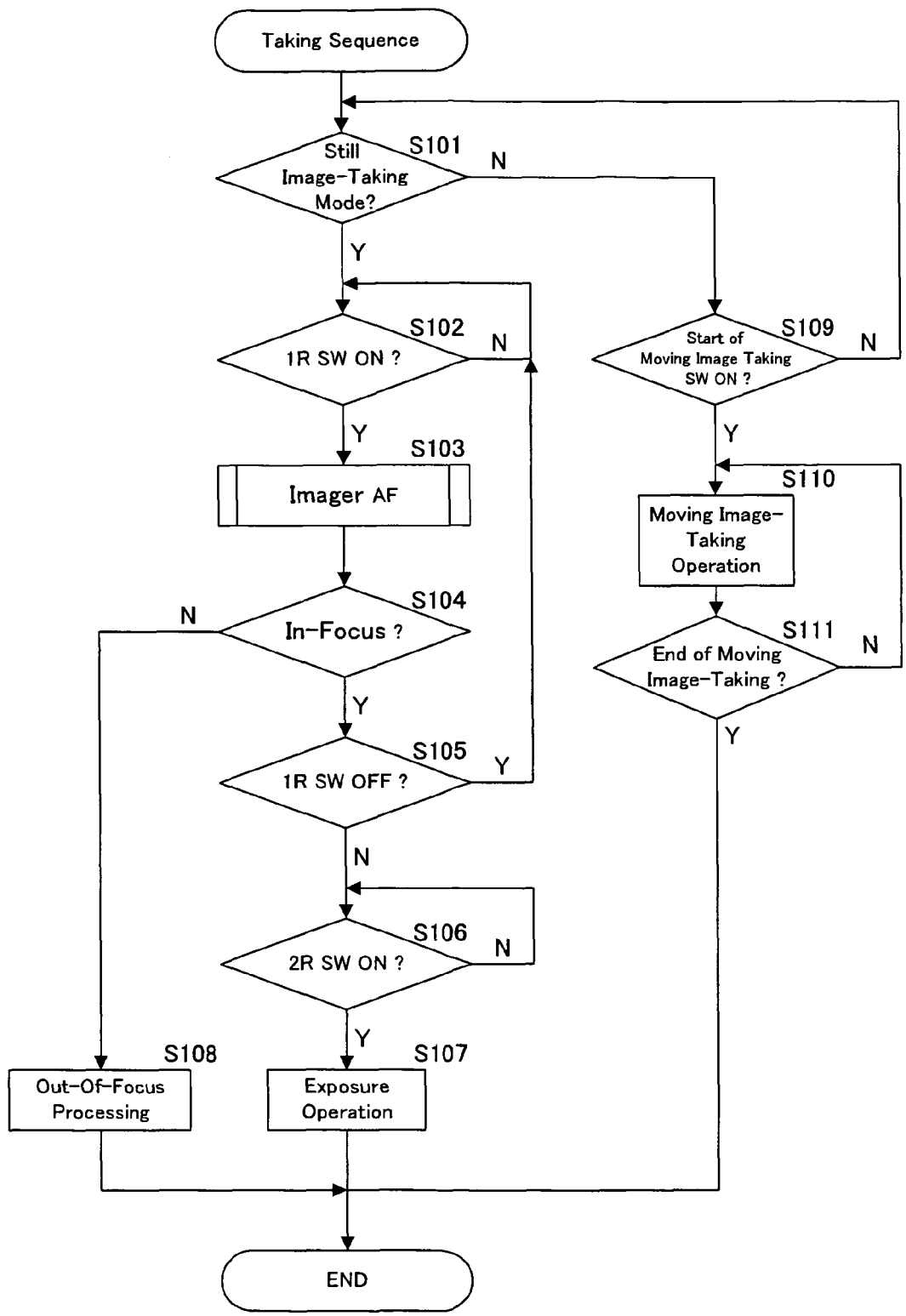
FIG. 22 is a flowchart illustrative of taking (imaging) sequence operation.

FIG. 22 is a flowchart indicative of the operation of the imaging sequence.

The operation of this imaging sequence is controlled chiefly by control of the BCPU 60.

First of all, in Step 101, the BCPU 60 judges whether or not the still image-taking mode is set by the operator who is manipulating the camera manipulation switch assembly 78 (S101). With the still image-taking mode already set, the BCPU 60 goes to Step 102. With the still image-taking mode not set, that is, with the moving image-taking mode set, the BCPU 60 goes to Step 109. It is here to be noted that any reproduction mode is left out because of having nothing to do with the invention.

In Step 102, the BCUP 60 judges whether or not the release switch in the camera manipulation switch assembly 78, i.e., the first release switch (1RSW) is half pushed by the operator (S102). With the release switch half pushed, the BCUP 60 goes to Step 103 for implementing imager AF (S103).

Then, in Step 104, the BCUP 60 judges the in-focus state (S104). With the in-focus state being reached, it shifts to Step 105 for judging whether or not the first release switch (1RSW) is put off (S105). In Step 104, when an out-of-focus state is found, the BCPU 60 shifts to Step 108 for implementing processing such as out-of-focus display (S108).

Here as the operator finishes just the half-push operation without going further to the full-push operation, it lets the BCPU 60 shift to the above Step 102, waiting for the first release switch (1RSW) to be pushed.

As the BCPU 60 judges the release switch to keep on the half-push operation, on the other hand, it goes to Step 106 to judge whether or not the operation of the second release switch (2RSW) that is the full-push operation of the release switch has been finished (S106). The BCPU 60 here waits until the release switch is full-pushed, and if full-pushed, the BCPU 60 then goes to Step 107 for exposure operation (S107).

If the moving image-taking mode prevails in Step 101, on the other hand, the BCPU 60 goes to Step 109 to judge whether or not the moving image-taking start switch in the camera manipulation switch assembly 78 is put on (S109). As the moving image-taking start switch is judged to be on in Step 109, it causes the moving image-taking operation to be implemented in Step 110 (S110). During the moving image-taking operation, whether or not the moving image-taking start switch is held off is checked up in Step 111 (S111). If not held off, the moving image-taking operation is kept on, and if held off, the moving image-taking operation is finished: the sequence here is finished. On the other hand, if the moving image-taking start switch is not held on in Step 109, the BCPU 60 goes back to Step 101.

It is here to be noted that during the moving image-taking operation, the imager AF operation is being implemented all the time.

The term moving image used herein is understood to embrace not only a live view moving image being displayed on the liquid crystal monitor 66 but also a moving image to be recorded in the recording medium 65.

Figure 23:
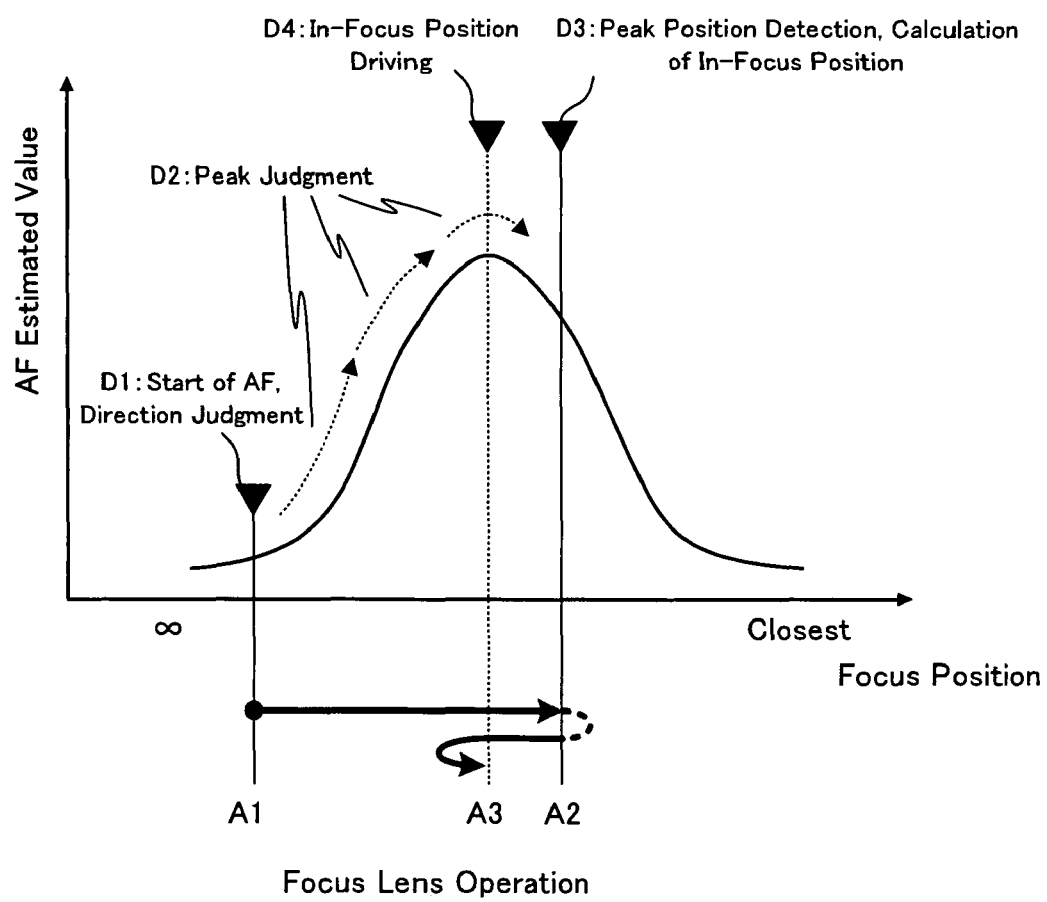
FIG. 23 is illustrative of operation of the focusing lens during imager AF operation: it is illustrative of relations of AF estimated values to the lens position of the focusing lens.
Figure 24:
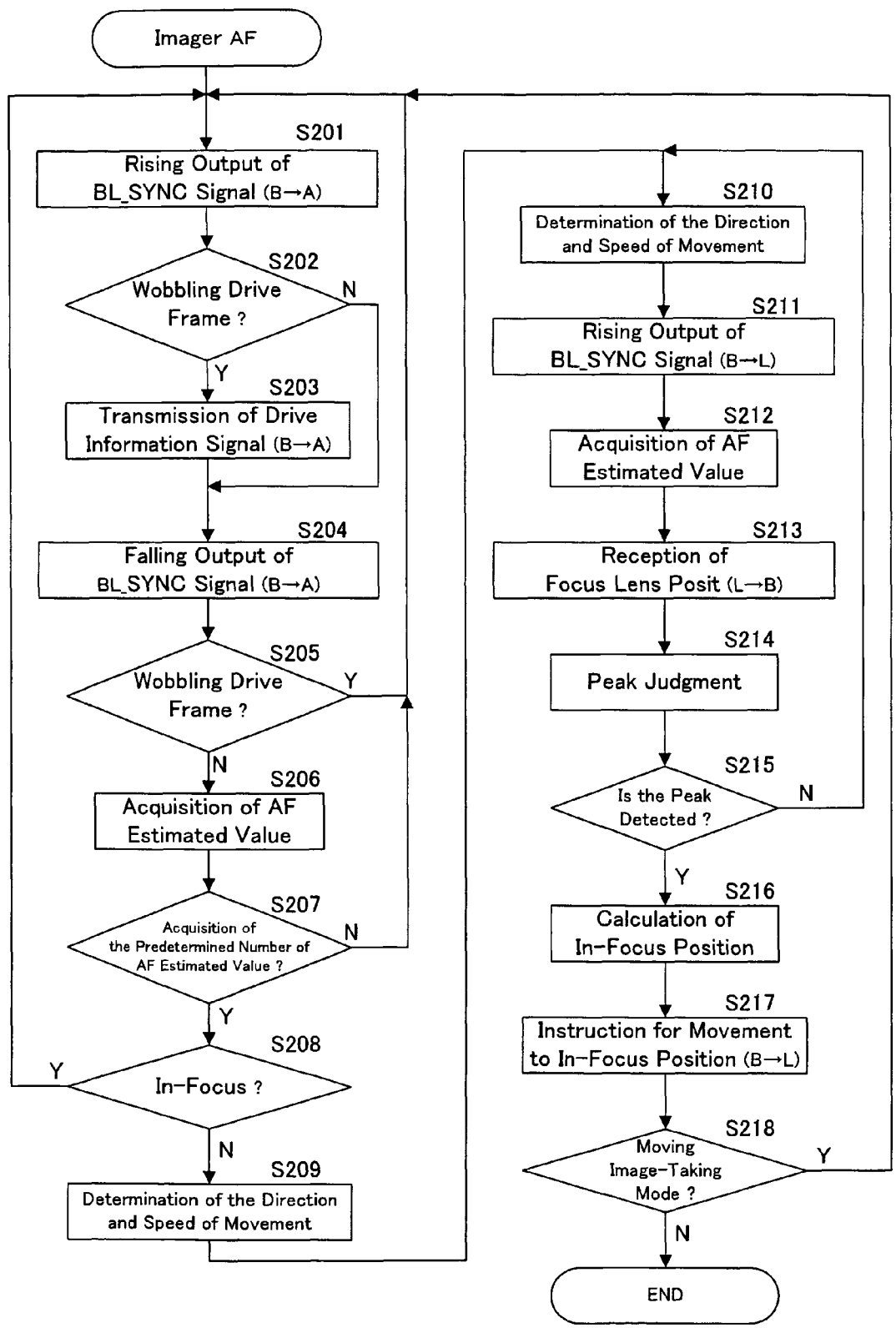
FIG. 24 is a flowchart illustrative of imager AF operation.

FIG. 23 is illustrative of relations between AF estimated values and the position of the focus lens 21 for providing an explanation of how the focus lens operates during the imager AF operation, and FIG. 24 is a flowchart illustrative of the imager AF operation.

The AF estimated value is equivalent to a contrast value: it is numeral data indicative of how much an image blurs. To this end, generally, there is a value obtained by applying HPF or BPF to image data and accumulating up the results.

First of all, the imager AF operation is briefly explained. The imager AF operation involves direction-judgment processing D1 and hill-climbing controls D2, D3 and D4. It is to be noted that the operation flowchart here is to be executed by the BCPU 60.

With the focus lens moving from a position A1 away from the in-focus position toward the in-focus position A3, the closer it comes to, the larger an AF estimated value (contrast value) figured out of an image becomes, and it reaches a maximum at the in-focus position A3.

While the focus lens is moved, the position of the focus lens is acquired in timing synchronous with the exposure of the imaging device. Then, a focus lens position at which the AF estimated value reaches a maximum is determined on the basis of the AF estimated value figured out of the acquired image, and finally the focus lens is moved to that position for focusing. This is generally called the hill-climbing controls D2, D3 and D4.

In the embodiment here, the direction-judgment processing D1 is first implemented by the wobbling operation of the wobbling lens group 121 in the attachment 112, thereby judging the initial driving direction of the focus lens 21 at the imager AF start.

Figure 25:
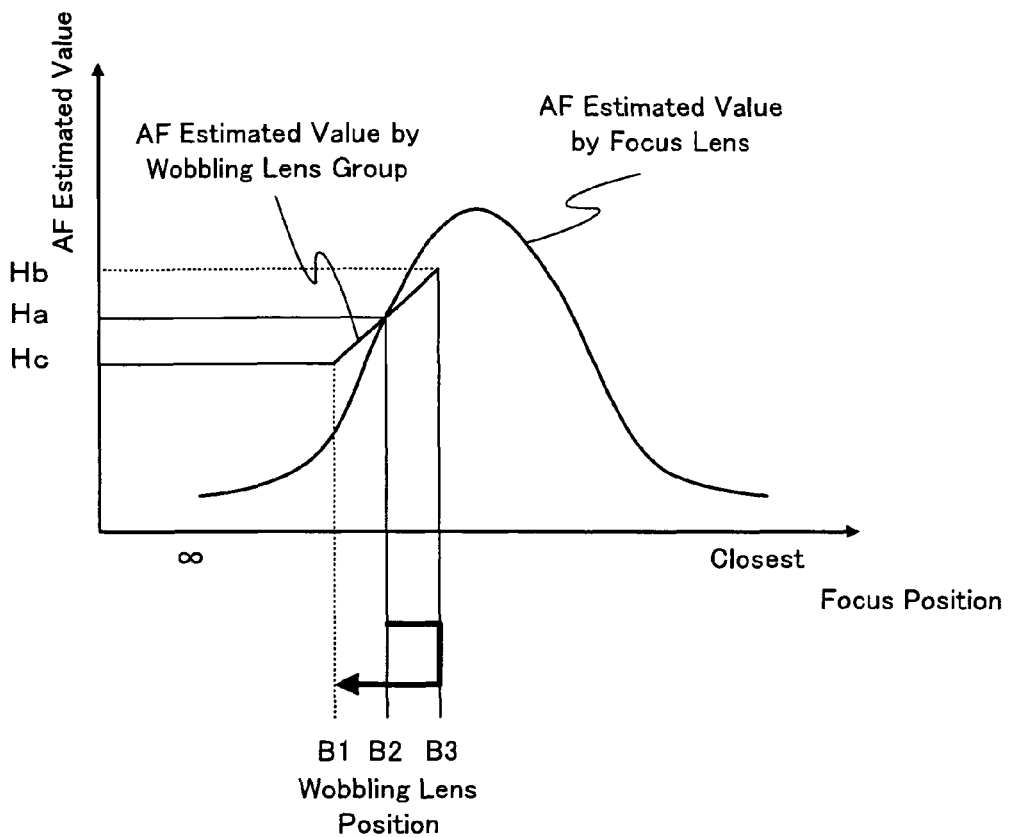
FIG. 25 is illustrative of AF estimated values for operation of the wobbling lens group.
Figure 26:
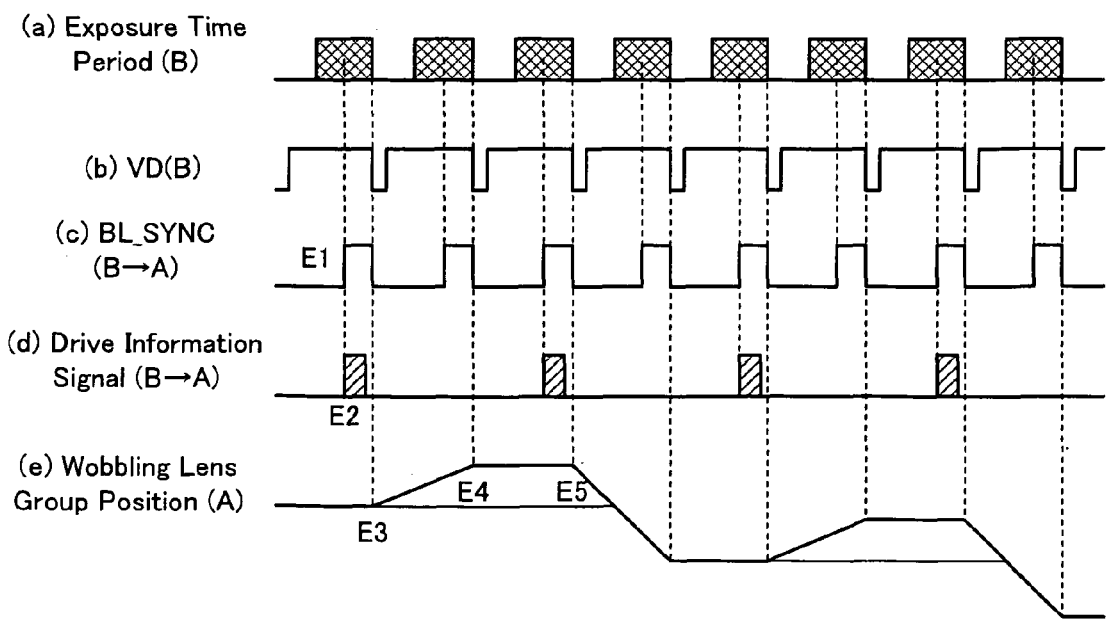
FIG. 26 is a timing chart for wobbling lens operation.

FIG. 25 is indicative of the AF estimated value for the operation of the wobbling lens group, and FIG. 26 is a timing chart for the wobbling lens operation.

First, the direction-judgment processing D1 executed by wobbling control is explained.

The wobbling control is briefly explained.

With the wobbling control, a direction in which there is an in-focus position where a larger estimated value is found is identified by controlling the focus lens in such a way as to wobble periodically by a minute distance to acquire an AF estimated value. The wobbling control, because the distance of wobbling of the focus lens group is minute, makes quality changes of moving images less noticeable, and prevents image quality from deteriorating.

In the example here, the attachment 112 has inside the wobbling lens group 121 capable of wobbling. The optical arrangement here is set up such that minute movement of the wobbling lens group 121 in the optical axis direction becomes optically equivalent to minute movement of the focus lens 21 in the optical axis direction. With the AF estimated value at a position to which the wobbling lens group 121 is minutely moved in the optical axis direction, accordingly, it is possible to identify the direction in which there is the in-focus position for the focus lens 21.

Assume now that, as shown in FIG. 25, the wobbling lens group 121 lies at a position B2. The wobbling lens group 121 moves from the position B2 to a position B3 by wobbling control, and then moves from the position B3 to a position B1. And AF estimated values are found from the images acquired at the positions B1, B2 and B3 to determine the direction in which there is the in-focus position.

Referring to FIG. 25(a) as an example, when the wobbling lens group 121 moves from the position B2 to the position B3, the AF estimated value goes from Ha up to Hb, and when it moves from the position B3 to the position B1, the AF estimated value goes from Hb down to Hc. It is therefore possible to learn that there is the in-focus position in the direction of the position B3 as viewed from the position B2; if the focus lens 21 in the lens unit 11 is moved from the position B2 toward the position B3, it is then possible for the focus lens 21 to draw closer to the in-focus position.

The timing for wobbling control is now explained.

As shown in FIG. 26(b), the imaging device interface circuit 61 periodically generates vertical synchronization signals VD, and produces them out to the imaging device 54 and BCPU 60. The imaging device 54 implements exposure in synchronization with the vertical synchronization signals VD as shown in FIG. 26(a), and the BCPU 60 generates from a given point of time exposure synchronization signals BL☐SYNC based on the vertical synchronization signals, as shown FIG. 26(c).

The BCPU 60 has previously a grasp of exposure start timing and exposure end timing on the vertical synchronization signals, so that it can generate BL☐SYNC signals that are exposure synchronization signals. The BL☐SYNC signal is one whose rising output stands for the center of exposure time period of the imaging device. Alternatively, the BL☐SYNC signal may be used as a signal indicative of the exposure time period of the imaging device or a signal whose rising is indicative of exposure being started and whose falling is indicative of exposure being over.

The BCPU 60 has the vertical synchronization signals VD entered from the imaging device interface circuit 61 in it, and creates and produces the BL☐SYNC signals out to the LCPU 30 and ACPU 130. In turn, the LCPU 30 controls the driving of the focus lens 21 in synchronization with the BL☐SYNC signals, and the ACPU 131 drives and controls the wobbling lens group 121 in synchronization with the BL☐SYNC signals.

Of the imager AF operation, the wobbling control as the direction-judgment processing D1 is now explained at great length with reference to Step 201 through 208 in the flowchart presented as FIG. 24.

The BCPU 60 controls operation timing on the basis of the vertical synchronization signals VD and, in Step 201, lets the imaging device 54 implement exposure and transmits the rising output of the BL☐SYNC signal to the ACPU 130 at the center time of exposure as shown at E1 in FIG. 26(c) (S201).

Then in Step 202, whether or not the frame is one to which wobbling drive is to be applied is judged (S202), and when that frame is the one to which wobbling drive is to be applied, the BCPU 60 goes to Step 203, whereas when the frame is not the one, the BCPU 60 goes to Step 204.

In Step 203, the drive information signal indicated at E2 in FIG. 26(d) is transmitted to the ACPU 130 (Step 203). The drive information signal commands the start of wobbling operation, and contains the following information about wobbling control.

(1) Information about the time period from the start of driving the wobbling lens group by the time of finishing it (wobbling drive time),
(2) Information about the amount of movement of the wobbling lens group, and
(3) Information about the direction of movement of the wobbling lens group.

Figure 27:
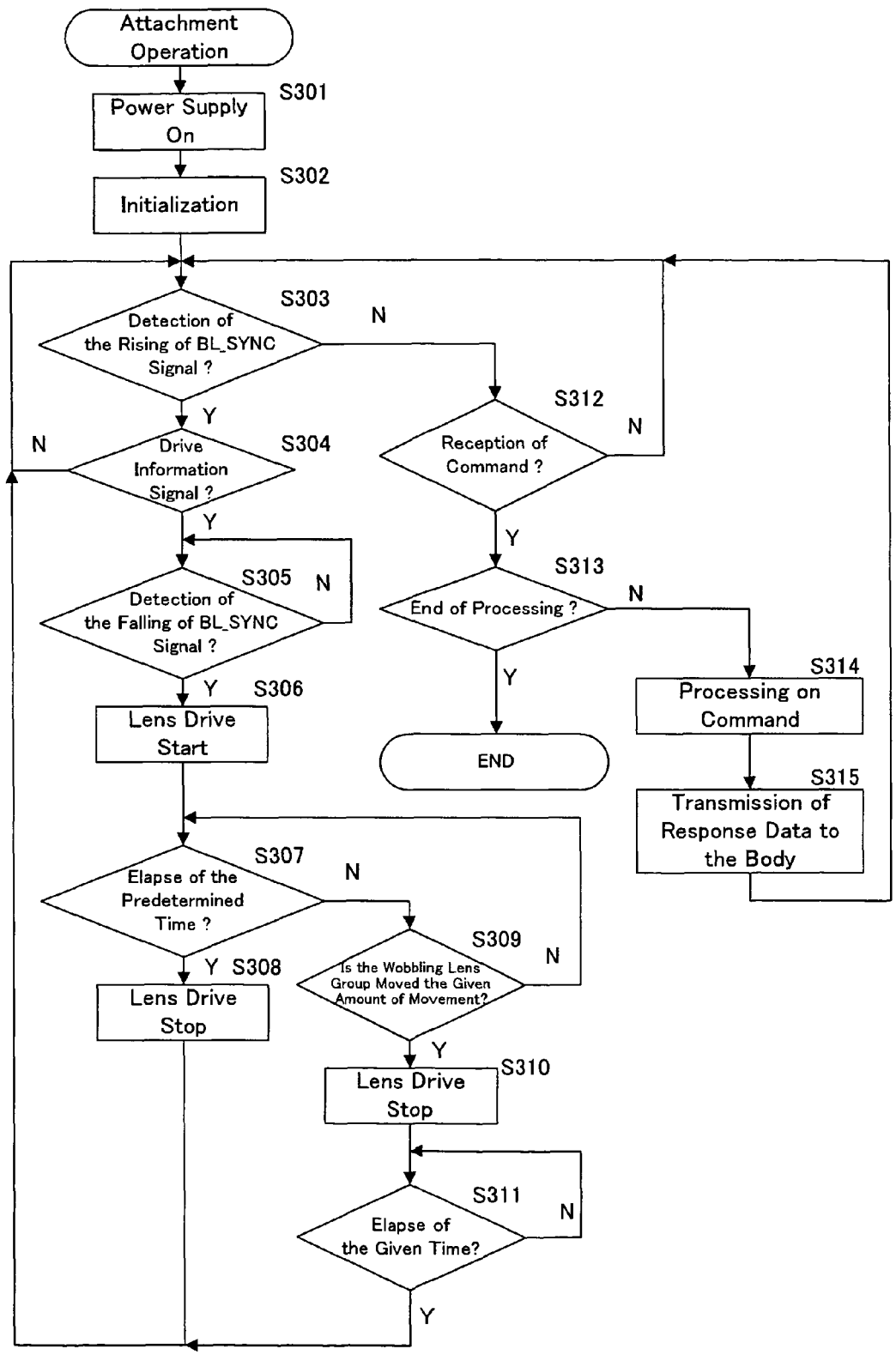
FIG. 27 is a flowchart for ACPU operation.

In Step 204, after the elapse of a predetermined time from the rising output of the BL☐SYNC signal, the falling output of the BL☐SYNC signal indicated at E3 in FIG. 27 is transmitted to the ACPU 130 (S204). In FIG. 26, this is synchronized with the falling of the vertical synchronization signal VD.

As shown in FIG. 26(e), the ACPU 130 receives the falling output of the above BL☐SYNC signal to move the wobbling lens group 121 by the operating time indicated by the drive information signal and by the direction and amount of movement indicated by the drive information signal. Detailed operation of the ACPU 130 will be described later.

In Step 205, whether or not the frame is one to which wobbling drive is to be applied is judged (S205), and when the frame is not the one, the ACPU 130 goes to Step 206, whereas when the frame is just the one, the ACPU 130 goes back to Step 201.

In Step 206, the AF estimated value is figured out on the basis of the acquired image, and then stored in the SDRAM 63 (S206). The AF estimated value is figured out of the image exposed between E4 and E5 in FIG. 26.

In Step 207, whether or not the predetermined number of AF estimated values are acquired is judged (S207). The predetermined number is the one needed for judging the direction of the in-focus position, for instance, 3. And when the predetermined number of AF estimated values are not acquired, the ACPU 130 goes back to Step 201 where the above operation is repeated until the predetermined number is obtained.

In Step 208, in-focus judgment is implemented on the basis of the acquired AF estimated values (S208). For instance, if, of the AF estimated values at the above three distinct positions of the wobbling lens group 121, a difference between the two AF estimated values corresponding to the positions of both termini is less than a predetermined value, that is taken as being positioned at the peak of the AF estimated values: it is judged as being in focus.

If there is an out-of-focus state, the ACPU 130 shifts to Step 209, and if there is the in-focus state, it returns back to Step 201.

In Step 209, the direction of the in-focus position is judged on the basis of the acquired predetermined number of AF estimated values to determine the direction and speed of the focus lens 21 in the lens unit 12 (the amount of movement per unit time) (S209).

The aforesaid S201 through S209 are part of the processing of determining the direction and speed of movement of the focus lens 21 by wobbling control. By controlling the drive and stop of the wobbling lens group 121 in frame unit, it is thus possible to bring the wobbling lens group 121 to a stop as the images for figuring out the AF estimated values are exposed to light: it is possible to prevent image deterioration, i.e., AF estimated value deterioration that may otherwise be caused by movement of the wobbling lens group, with improved AF precision.

While the wobbling drive time is here supposed to be the time necessary for one frame of the image being taken, that may be an integral multiple of the time needed for one frame. If the upper limit to the wobbling drive time is set in frame unit, it is then possible to implement the drive and stop of the wobbling lens group 121 in frame unit.

The foregoing is the explanation of the direction-judgment processing D1.

The then attachment operation is now explained.

FIG. 27 is a flowchart illustrative of the operation of the ACPU 130.

In Step 301, upon reception of a command for initialization based on the judgment by the BCPU 60 to put power supply on (S301), the ACPU 130 implements initialization in the subsequent Step 302 (S302).

Then, in Step 303, the ACPU 130 judges whether or not there is the generation of the rising output of the BL☐SYNC signal transmitted from the BCPU 60 (S303). When, as a consequence of this judgment, the generation of the rising output of the BL☐SYNC signal is detected (FIG. 26: E1), the ACPU 130 is on standby, waiting to receive the drive information signal in Step 304 (S304). And when the ACPU 130 receives the drive information signal, it goes to Step 305 (FIG. 26: E2), whereas when it does not, it returns back to Step 303.

Then, in Step 305, the ACPU 130 judges whether or not there is the generation of the falling output of the BL☐SYNC signal transmitted from the BCPU 60 (S305). When, as a result of this judgment, the generation of the falling output of the BL☐SYNC signal is detected (FIG. 26: E3), the ACPU 130 goes to Step 306, whereas when it is not, the ACPU 130 returns back to Step 305.

In Step 306, the ACPU 130 drives the wobbling lens group 121 via the wobbling drive circuit 125 (S306) (FIG. 26: E3). At this time, the wobbling lens group 121 is driven on the basis of the wobbling drive time and the direction and speed of movement contained in the received drive information signal.

In Step 307, it is judged whether or not the predetermined time that is the received wobbling drive time elapses from the drive start (S307), and when there is an elapse, the ACPU 130 goes to Step 308 to stop the driving of the wobbling lens group 121 (S308) (FIG. 5: E4). Thus, with the elapsing time exceeding the wobbling drive time, the driving of the wobbling lens group 121 is forcibly stopped even when the wobbling lens group 121 does not move the amount of movement indicated by the drive information signal.

The ACPU 130 stores in memory the fact that the wobbling lens group 121 has not moved the instructed amount of movement, and transmits it to the BCPU 60 during data communication, warning that the AF estimated value of this frame should not be used.

When the predetermined time does not elapse, on the other hand, the ACPU 130 goes to Step 309 where it is judged whether or not the wobbling lens group moves the predetermined amount of movement (S309). And when it has moved the predetermined amount of movement, the ACPU 130 goes to Step 310, stopping the lens drive of the wobbling lens group 121 (S310) (FIG. 5: E4). And the ACPU 130 goes to Step 311, waiting for the predetermined time to go by (S311), and thereafter returning back to Step 303.

When there is no generation of the rising output of the BL☐SYNC signal in Step 303, on the other hand, the ACPU 130 goes to Step 312, judging whether or not there is a command received from the BCPU 60 (S312).

As the ACPU 130 is judged to receive the command from the BCPU 60, it judges in Step 313 whether or not that received command is a processing end command (S313), and if that is the processing end command, the processing is finished.

When the received command is not the processing end command, the ACPU goes to Step 314, executing processing pursuant to the received command (S314). In Step 315, data processed pursuant to the received command, i.e., response data to the command are transmitted to the BCPU 60 (S315).

By using the attachment having the wobbling function while it is inserted between the wobbling function-free master lens and the lens body as described above, it is thus possible to improve the speed of AF operation.

Figure 28:
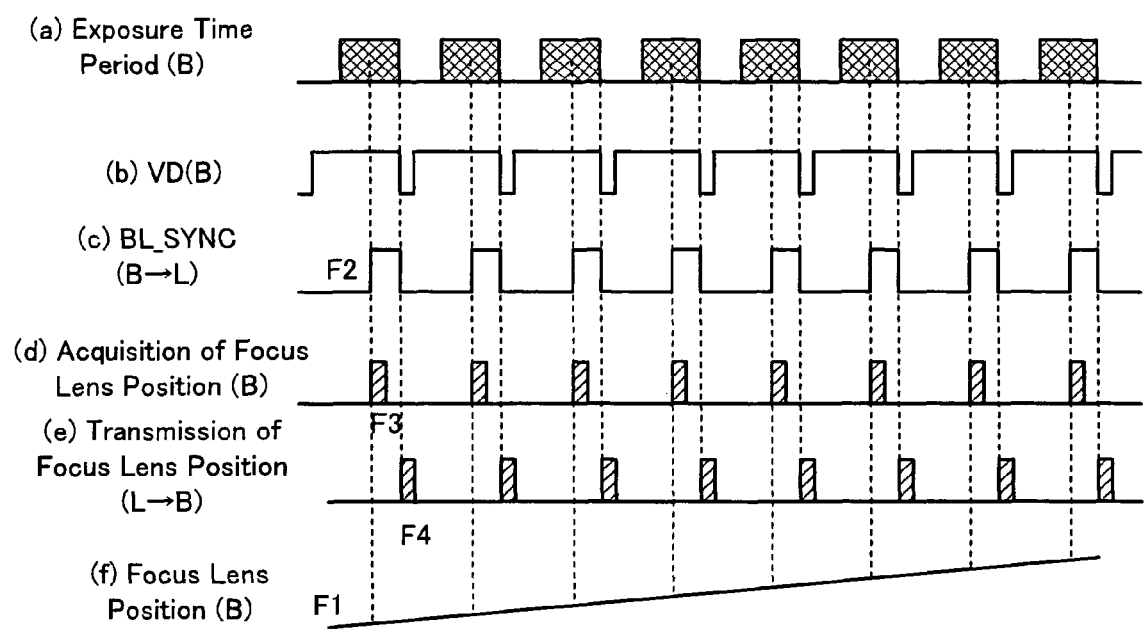
FIG. 28 is a timing chart for operation of peak estimation in imager AF operation.

The hill-climbing control is now explained. FIG. 28 is a timing chart for the peak judgment of imager AF operation. Here the flowchart illustrative of imager AF operation of FIG. 24 is further explained with reference to FIG. 28.

In Step 210, the BCPU 60 transmits the direction and amount of movement determined in Step 209 to the LCPU 30 in the lens unit 12 (S210). As shown in FIG. 28(f), the LCPU 30 drives the focus lens 21 on the basis of the received direction and speed of movement (FIG. 7: F1). It is here to be noted that the operation of the LCPU 30 will be described later at great length.

The BCPU 60 controls operation timing on the basis of the vertical synchronization signals VD and, in Step 211, lets the imaging device 54 implement exposure and transmits the rising output of the BL☐SYNC signal to the LCPU 30 at the center time of exposure, as shown in FIG. 28(c) (FIG. 28: F2). The LCPU 30 receives the rising output of the BL☐SYNC signal as shown in FIG. 28(d) thereby acquiring the position of the focus lens 21 (FIG. 28: F3).

In Step 212, the AF estimated value is figured out on the basis of the taken image (S212). And, as shown in FIG. 28(e), the focus lens position is received at the LCPU 30 in Step 213 (S212) (FIG. 28: F4).

Then, in Step 214, peak judgment (FIG. 23: D2) is implemented (S214), and whether or not the peak is detected is judged in the subsequent Step 215 (S215). Here, with any peak undetected, the BCPU 60 shifts to the aforesaid Step 210 where the above processing operation is repeated until the peak is detected.

With the peak detected by the above processing operation, the BCPU 60 shifts to Step 216 where the in-focus position is figured out (S216) (FIG. 23: D3).

And, in Step 217, the BCPU 60 transmits a command to the CLPU 30 such that the focus lens 21 is moved to the in-focus position (S217). The LCPU 30 drives the focus lens 21 to the in-focus position (FIG. 23: D4).

In Step 218, whether or not there is the moving image-taking mode is judged (S218). If there is the moving image-taking mode, the BCPU 60 returns back to Step 201 so as to keep AF operation going on. If there is none of the moving image-taking mode, the BCPU 60 brings processing to an end.

Through a series of operations, the focus lens 21 moves from an A1 point for the start of AF estimated value acquisition (D1) toward the closest side, and with the peak detected, the in-focus position is figured out (D3). With that, the direction of movement of the focus lens 21 is reversed back so that the focus lens 21 moves from an A2 point toward the infinity (∞) side. And the focus lens 21, once having passed through the peak position, travels toward an A3 point that is the in-focus position with its direction of movement again reversed back. This is to eliminate influences of backlash present in the lens drive mechanism 24, etc., and bring the focus lens precisely to a stop at the optically same position when passing the peak of the AF estimated values. By doing so, the focus lens 21 arrives at the A3 point that is the in-focus position.

The foregoing is the explanation of the hill-climbing controls D2, D3 and D4.

The then lens operation flow is now explained.

Figure 29:
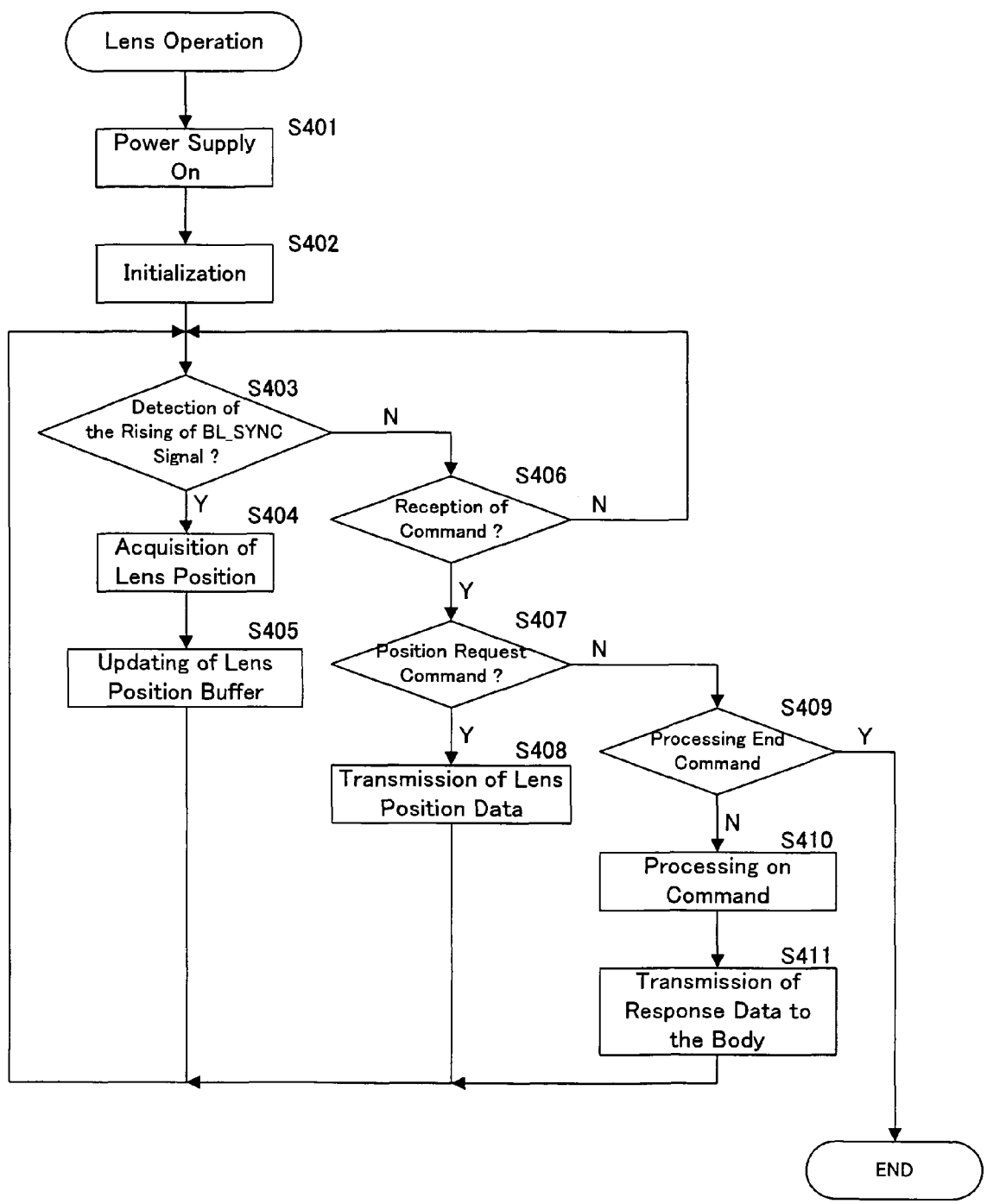
FIG. 29 is a flowchart for LCPU operation.

FIG. 29 is a flowchart illustrative of the operation of the LCPU 30.

In Step 401, upon reception of a command for initialization based on the judgment by the BCPU 60 to put power supply on (S401), the LCPU 30 implements initialization in the subsequent Step 402 (S402).

Then, in Step 403, the LCPU 30 judges whether or not there is the generation of the rising output of the BL☐SYNC signal transmitted from the BCPU 60 (S303). When, as a consequence of this judgment, the generation of the rising output of the BL☐SYNC signal is detected (FIG. 28: F2), the LCPU 30 detects in Step 404 the position information of the focus lens 21 along the optical axis through a position detection circuit in the lens drive circuit 25 (S404).

Here the LCPU 30 detects the position information of the focus lens 21 upon generation of the rising output of the BL☐SYNC signal, as shown in FIG. 28(d) (FIG. 28: F3).

Then, the LCPU 30 updates in Step 405 information stored in a built-in buffer memory: it stores the position information of the focus lens 21 in the built-in buffer memory (S405). And the LCPU 30 returns back to Step 403, and when the generation of the rising output of the BL☐SYNC signal is detected, the operation for acquiring the focus lens position is repeatedly implemented.

When there is no generation of the rising output of the BL☐SYNC signal in Step 403, on the other hand, the LCPU 30 shifts to Step 406, judging whether or not there is a command received from the BCPU 60 (S406).

As there is a command received from the BCPU 60 as a consequence of that judgment, the LCPU 30 judges in Step 407 whether or not the command received is a request for the position information of the focus lens 21 (S407). And if the received command is a request for the position information of the focus lens 21, the LCPU 30 shifts to Step 408, transmitting to the BCPU 60 the position information of the focus lens 21 stored in a built-in buffer memory (S408) (FIG. 28: F4).

It is here to be noted that if, as a result of judgment in Step 407, the received command is not the request for the position information of the focus lens 21, the LCPU 30 shifts to Step 409, judging whether or not that is the processing end command (S409). If that is the processing end command, the LCPU 30 brings processing to an end.

If the command is not the processing end command, the LCPU 30 goes to Step 410, executing processing pursuant to the received command, for instance, the driving of the focus lens 21 (S410) and, in Step 411, transmits to the BCPU 60 data processed pursuant to the received command, i.e., response data to the command, for instance, data indicative of the focus lens 21 being driven (S411).

The arrangement described above makes it possible to detect state changes in the contrast on images on the imaging device 54 in the camera body 11, which are brought about by reciprocal movement of the wobbling lens group 121 in the attachment lens device so that the direction and amount of movement of the focusing lens group to obtain contrast as close to its peak as possible can be figured out by calculation.

Signals can be transmitted from the camera body 11 to the focusing lens group in the master lens 12 so that fast focusing can be implemented.

Even with the master lens 12 having no wobbling capability, it is possible to boost up focusing speed and the ability of focusing to follow moving images during taking if it is mounted on the camera body 11 via the attachment lens device 12.

In the embodiment here, the wobbling operation of the wobbling lens group 121 and the moving operation of the focus lens 21 are executed in time-division fashion; however, both may be implemented at the same time.

If the wobbling lens group 121 is wobbled to acquire AF estimated values for focus adjustment while the focus lens 21 is on the move, it is then possible to implement faster focusing with higher ability to follow.

Specifically, the in-focus state is achievable by controlling the focus lens 21 such that it is moved to the focus lens position where the difference in the AF estimated values at positions at both termini of wobbling amplitude falls within the predetermined range.

What is claimed is:

1. An attachment lens device that can be attached between a master lens comprising a focusing lens group able to move in an optical axis direction for focusing purposes and a camera body comprising an imaging device, which comprises:
   a communication portion communicatable with said master lens and said camera body, a wobbling lens group capable of reciprocally wobbling in an optical axis direction to detect a direction of movement of said focusing lens group, and a wobbling drive portion for driving said wobbling lens group, wherein the communication portion comprises:

a first communication connector disposed on a master lens side of the attachment lens device, the first communication connector being electrically connected to the master lens when the master lens is connected to the attachment lens device, and a second communication connector disposed on a camera body side of the attachment lens device, the second communication connector being electrically connected to the camera body when the camera body is attached to the attachment lens device.

2. The attachment lens device according to claim 1, which further comprises an attachment control portion to alter an extent of movement of said wobbling lens group in the optical axis direction depending on an F-number of the master lens.

3. The attachment lens device according to claim 1, which further comprises:

an object-side lens group located on an object side of said wobbling lens group and remaining fixed during wobbling, and an image-side lens group located on an image side of said wobbling lens group.

4. The attachment lens device according to claim 3, wherein:

said wobbling lens group has positive refracting power that greater than an absolute value of refracting power of each of said object-side lens group and said image-side lens group.

5. The attachment lens device according to claim 4, wherein:

both said object-side lens group and said image-side lens group have negative refracting power.

6. An imaging apparatus, comprising:

a master lens having a focusing lens group that moves in an optical axis direction for focusing purposes, a camera body having an imaging device, and an attachment lens device as recited in claim 1.

7. The imaging apparatus according to claim 6, wherein:

said master lens, said camera body, and said attachment lens device each comprises a communicatable communication portion, and said camera body comprises a focus lens group drive signal generation portion that generates a signal for moving said focusing lens group in said master lens group in response to a contrast change brought about by reciprocal movement of said wobbling lens group.

8. An attachment lens device that can be attached between a master lens comprising a focusing lens group able to move in an optical axis direction for focusing purposes and a camera body comprising an imaging device, which comprises:

a communication portion communicatable with said master lens and said camera body, a wobbling lens group capable of reciprocally wobbling in an optical axis direction to detect a direction of movement of said focusing lens group, a wobbling drive portion for driving said wobbling lens group, and an attachment control portion to alter an extent of movement of said wobbling lens group in the optical axis direction depending on an F-number of the master lens, which satisfies the following condition (1) for an extent of reciprocal movement of said wobbling lens group in the optical axis direction:

$$D\text{wob}/(F no \times \beta w \times \epsilon) > 0.3 \quad (1)$$

where Dwob is half the extent of movement of said wobbling lens group in the optical axis direction, Fno is an F-number of a combined master lens/attachment lens device optical system during wobbling operation, βw is a magnification of the attachment lens device at the time when said wobbling lens group lies halfway the extent of reciprocal movement and said attachment lens device is attached to said camera body, and ε is a radius of an admissible circle of confusion, and defined as ε=0.0005 L where L is a diagonal length of an effective imaging area of said imaging device.

9. The attachment lens device according to claim 8, which satisfies the following condition (2):

$$0.3 < D\text{wob}/(F no \times \beta w \times \epsilon) < 3.0 \quad (2).$$

10. An attachment lens device that can be attached between a master lens comprising a focusing lens group able to move in an optical axis direction for focusing purposes and a camera body comprising an imaging device, which comprises:

a communication portion communicatable with said master lens and said camera body, a wobbling lens group capable of reciprocally wobbling in an optical axis direction to detect a direction of movement of said focusing lens group, and a wobbling drive portion for driving said wobbling lens group, which satisfies the following condition (3):

$$0.95 < \beta w < 1.3 \quad (3)$$

where βw is a magnification of said attachment lens device at the time when said wobbling lens group lies halfway the extent of reciprocal movement and said attachment lens device is attached to said camera body.

11. An attachment lens device that can be attached between a master lens comprising a focusing lens group able to move in an optical axis direction for focusing purposes and a camera body comprising an imaging device, which comprises:

a communication portion communicatable with said master lens and said camera body, a wobbling lens group capable of reciprocally wobbling in an optical axis direction to detect a direction of movement of said focusing lens group, a wobbling drive portion for driving said wobbling lens group, an object-side lens group located on an object side of said wobbling lens group and remaining fixed during wobbling, and an image-side lens group located on an image side of said wobbling lens group, wherein said wobbling lens group has positive refracting power that greater than an absolute value of refracting power of each of said object-side lens group and said image-side lens group, wherein both said object-side lens group and said image-side lens group have negative refracting power, which satisfies the following condition (4):

$$-0.9 < \phi w/(\phi O + \phi I) < -0.7 \quad (4)$$

where w is a refracting power of said wobbling lens group,

φO is a refracting power of said object-side lens group, and

φI is a refracting power of said image-side lens group.

12. The attachment lens device according to claim 11, which satisfies the following condition (5):

$$0.5 < \phi O/\phi 1 < 2.0 \tag{5}$$

13. An attachment lens device that can be attached between a master lens comprising a focusing lens group able to move in an optical axis direction for focusing purposes and a camera body comprising an imaging device, which comprises:
   a communication portion communicatable with said master lens and said camera body,
   a wobbling lens group capable of reciprocally wobbling in an optical axis direction to detect a direction of movement of said focusing lens group,
   a wobbling drive portion for driving said wobbling lens group,
   an object-side lens group located on an object side of said wobbling lens group and remaining fixed during wobbling, and
   an image-side lens group located on an image side of said wobbling lens group,
   wherein said wobbling lens group has positive refracting power that greater than an absolute value of refracting power of each of said obiect-side lens group and said image-side lens group,
   wherein said wobbling lens group comprises a lens of double-convex shape that has an object-side surface convex on its object side and an image-side surface convex on its image side and satisfies the following condition (6):

$$-0.8 < (RwO+Rwl)/(RwO-Rwl) < -0.1 \tag{6}$$

where RwO is the radius of curvature of the object-side surface in said wobbling lens group, and
   Rwl is the radius of curvature of the image-side surface in said wobbling lens group.

14. The attachment lens device according to claim 13, wherein:
   said wobbling lens group comprises a single lens of double-convex shape.

15. An attachment lens device that can be attached between a master lens comprising a focusing lens group able to move in an optical axis direction for focusing purposes and a camera body comprising an imaging device, which comprises:
   a communication portion communicatable with said master lens and said camera body,
   a wobbling lens group capable of reciprocally wobbling in an optical axis direction to detect a direction of movement of said focusing lens group,
   a wobbling drive portion for driving said wobbling lens group,
   an obiect-side lens group located on an object side of said wobbling lens group and remaining fixed during wobbling, and
   an image-side lens group located on an image side of said wobbling lens group,
   wherein said wobbling lens group has positive refracting power that greater than an absolute value of refracting power of each of said obiect-side lens group and said image-side lens group,
   wherein said wobbling lens group has an object-side surface convex on its object side, and
   wherein said object-side lens group has a concave surface opposite to the wobbling lens group, with satisfaction of the following conditions (7) and (8):

$$0.5 < ROl/RwO < 2.0 \tag{7}$$

$$0.5 < Rwl/RlO < 2.9 \tag{8}$$

where RwO is a radius of curvature of the object-side surface in said wobbling lens group,
   ROl is a radius of curvature of the concave surface of the object-side lens opposite to said wobbling lens group,
   Rwl is a radius of curvature of the image-side surface in said wobbling lens group, and
   RlO is a radius of curvature of the surface in said image-side lens group and opposite to said wobbling lens group.

16. An attachment lens device that can be attached between a master lens comprising a focusing lens group able to move in an optical axis direction for focusing purposes and a camera body comprising an imaging device, which comprises:
   a communication portion communicatable with said master lens and said camera body,
   a wobbling lens group capable of reciprocally wobbling in an optical axis direction to detect a direction of movement of said focusing lens group,
   a wobbling drive portion for driving said wobbling lens group,
   an object-side lens group located on an object side of said wobbling lens group and remaining fixed during wobbling, and
   an image-side lens group located on an image side of said wobbling lens group,
wherein:
   said object-side lens group comprises a positive lens and a negative lens concave on its image side, and
   said image-side lens group comprises a lens concave on its object side and an image-side lens different in a sign of refracting power from said lens concave on its object side, one being a positive lens and the other being a negative lens, with satisfaction of the following conditions (9) and (10):

$$-25 < vOp - vOn < -15 \tag{9}$$

$$10 < vlp - vln < 25 \tag{10}$$

where vOp is an Abbe constant of the positive lens in the object-side lens group,
   vOn is and Abbe constant of the negative lens in the object-side lens group,
   vlp is an Abbe constant of the positive lens in the image-side lens group, and
   vln is and Abbe constant of the negative lens in the image-side lens group.

17. An imaging system, which comprises:
   a lens-interchangeable camera body having an imaging plane and an autofocus mechanism for detecting contrast on said imaging plane to implement focusing,
   a master lens that has an electrically operating focus lens group, is electrically connectable to said camera body and has a flange back longer than that of said camera body, and
   an attachment lens device that is mounted between said master lens and said camera body in such a way as to provide mechanical and electrical connections between said master lens and said camera body, and has one or more built-in lenses, wherein:
   said master lens, said camera body and said attachment lens device are capable of communicating with one another,
   said attachment lens device comprises a wobbling lens group enabling a whole or a part of lenses in said attachment lens device to be movable in an optical axis direction, said master lens and said attachment lens device are attached to said camera body, and said imaging system further comprises an AF control mechanism wherein when a value of contrast on said imaging plane is estimated to be low, said focus lens group in said master lens is moved in a certain direction while the contrast on said imaging plane is detected, and said focus lens group in said master lens is brought to a stop at a position where a position at which the value of contrast is estimated to be highest is substantially in alignment with the position of said imaging plane, and near an in-focus position, said wobbling lens group in said attachment lens device is reciprocally moved in an optical axis direction to detect contrasts near both termini of reciprocal movement, and said focus lens group in said master lens is moved such that the values of contrast at both termini are estimated to be substantially constant, thereby maintaining an in-focus state.

18. The imaging system according to claim 17, wherein:
said camera body comprises an image processing portion for helping correct distortion by image correction.

19. The imaging system according to claim 17, wherein:
said camera body comprises a display portion for displaying an image subjected to contrast detection, and
a recording portion for recording an image subjected to contrast detection.

20. The imaging system according to claim 17, wherein:
said camera body comprises an image capturing portion for capturing an image at the time when said wobbling lens group is reciprocally moved in the optical axis direction for contrast detection,
an image correction portion for electrically correcting a captured image for distortion in association with the movement of said wobbling lens group and an image capturing state, a display portion for providing a display using an image after said image correction, and
a recording portion for recording an image after said image correction.

21. The imaging system according to claim 17, wherein:
an image circle of said master lens is substantially the same as that of said camera body.

22. The imaging system according to claim 17, wherein:
at least one of speed and amount of movement of said wobbling lens group changes depending on an actual diaphragm stop of said master lens upon contrast estimation.

23. The imaging system according to claim 17, wherein:
there is no direct communication between said master lens group and said camera body, and said master lens group, said camera body and said attachment lens device are integrally controlled via said master lens group and said attachment lens device.

24. The imaging system according to claim 17, wherein:
any one of said master lens, said attachment lens device and said camera body comprises a parameter recording portion where parameters upon connection of said master lens and said wobbling lens device are recorded, and
said camera body uses said parameters during focusing operation.

25. An imaging system, which comprises:
a lens-interchangeable camera body having an imaging plane and an autofocus mechanism for detecting contrast on said imaging plane to implement focusing,
a master lens that has an electrically operating focus lens group, is electrically connectable to said camera body and has a flange back longer than that of said camera body, and
an attachment lens device that is mounted between said master lens and said camera body in such a way as to provide mechanical and electrical connections between said master lens and said camera body, and has one or more built-in lenses, wherein:
said master lens, said camera body and said attachment lens device are capable of communicating with one another,
said attachment lens device comprises a wobbling lens group enabling a whole or a part of lenses in said attachment lens device to be movable in an optical axis direction,
said master lens and said attachment lens device are attached to said camera body, and
said imaging system further comprising an AF control mechanism wherein when the value of contrast on said imaging plane is estimated to be low, said focus lens group in said master lens is moved in a certain direction while the contrast on said imaging plane is detected, and if the value of contrast is estimated to be greater than a given level, said focus lens group is brought to a stop, and
while said focus lens group remains stopped, said wobbling lens group in said attachment lens device is reciprocally moved in an optical axis direction to move said focus lens group in said master lens device such that the values of contrast near both termini of reciprocal movement are estimated to be substantially constant, arriving at an in-focus state.

* * * * *